US012087234B2

(12) United States Patent
Sung et al.

(10) Patent No.: US 12,087,234 B2
(45) Date of Patent: Sep. 10, 2024

(54) DISPLAY DEVICE

(71) Applicant: Samsung Display Co., Ltd., Yongin-si (KR)

(72) Inventors: Kihyun Sung, Suwon-si (KR); Jongwoon Kim, Hwaseong-si (KR); Taegyun Kim, Seoul (KR); Ickkyu Jang, Yongin-si (KR); Jooyoung Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 37 days.

(21) Appl. No.: 17/724,998

(22) Filed: Apr. 20, 2022

(65) Prior Publication Data

US 2023/0005436 A1 Jan. 5, 2023

(30) Foreign Application Priority Data

Jul. 2, 2021 (KR) ........................ 10-2021-0087410

(51) Int. Cl.
*G09G 3/3275* (2016.01)

(52) U.S. Cl.
CPC ... *G09G 3/3275* (2013.01); *G09G 2320/0626* (2013.01); *G09G 2330/021* (2013.01)

(58) Field of Classification Search
CPC ................ G09G 2340/06; G09G 5/02; G09G 2320/0686; G09G 3/3208; G09G 3/3426; G09G 2320/0626; G09G 3/3275
See application file for complete search history.

(56) References Cited

U.S. PATENT DOCUMENTS

| | | | | |
|---|---|---|---|---|
| 9,691,353 B2 | 6/2017 | Joo et al. | | |
| 2015/0235619 A1* | 8/2015 | Yeo | G09G 3/3413 | 345/690 |
| 2016/0217731 A1 | 7/2016 | Joo et al. | | |
| 2019/0180703 A1* | 6/2019 | Yata | G09G 3/3607 | |

FOREIGN PATENT DOCUMENTS

| | | | |
|---|---|---|---|
| KR | 1020160092537 A | 8/2016 | |
| KR | 1020160095673 A | 8/2016 | |
| KR | 102020283 B1 | 9/2019 | |

* cited by examiner

Primary Examiner — Hau H Nguyen
(74) *Attorney, Agent, or Firm* — CANTOR COLBURN LLP

(57) ABSTRACT

A display device includes: a display panel including a first display area and a second display area; and a panel driving block which provides, to the first display area, a first data signal generated by converting a first image signal, which corresponds to the first display area, based on a first reference color coordinates in a color space, and provides, to the second display area, a second data signal generated by converting a second image signal, which corresponds to the second display area, based on second reference color coordinates in the color space. The second reference color coordinates are color coordinates obtained by shifting the first reference color coordinates in the color space.

20 Claims, 12 Drawing Sheets

| Y \ X | X1 | X2 | X3 |
|---|---|---|---|
| Y1 | 13.98 | 13.83 | 13.70 |
| Y2 | 14.20 | 14.06 | 13.92 |
| Y3 | 14.42 | 14.28 | 14.13 |

< Light Emission Efficiency (cd/A)>

DISPLAY DEVICE

This application claims priority to Korean Patent Application No. 10-2021-0087410, filed on Jul. 2, 2021, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device capable of reducing power consumption.

Various types of display devices have been used to provide image information. In particular, the display device has employed an organic light emitting display ("OLED") device, a quantum dot display device, a liquid crystal display ("LCD") device, or a plasma display device.

The display device includes a display panel to display an image and a panel driving block coupled to the display panel to apply a driving signal to the display panel. The display panel may include light emitting elements to emit light. The OLED device includes an organic light emitting element to emit light.

SUMMARY

Embodiments of the present disclosure provide a display device capable of reducing power consumption.

According to an embodiment of the present disclosure, a display device includes: a display panel including a first display area and a second display area and a panel driving block. The panel driving block provides, to the first display area, a first data signal generated by converting a first image signal, which corresponds to the first display area, based on first reference color coordinates in the color space. The panel driving block provides, to the second display area, a second data signal generated by converting a second image signal, which corresponds to the second display area, based on second reference color coordinates in the color space. The second reference color coordinates may be color coordinates obtained by shifting the first reference color coordinates in the color space.

According to an embodiment of the present disclosure, the first display area may correspond to the central portion of the display panel, and the second display area may be adjacent to the first display area.

According to an embodiment of the present disclosure, the color space may include a first color having a first wavelength, a second color having a second wavelength shorter than the first wavelength, and a third color having a third wavelength shorter than the second wavelength. The second reference color coordinates may be color coordinates obtained by shifting the first reference color coordinates toward the second color in the color space.

According to an embodiment of the present disclosure, the display panel may include a display element layer including a plurality of light emitting elements. The light emitting elements may include a first light emitting element which emits light having a first color, a second light emitting element which emits light having a second color, and a third light emitting element which emits light having a third color.

According to an embodiment of the present disclosure, the first light emitting element may have a first light emission efficiency, and the second light emitting element may have a second light emission efficiency greater than the first light emission efficiency. The third light emitting element may have the third light emission efficiency less than the first light emission efficiency.

According to an embodiment of the present disclosure, each of the first data signal and the second data signal may include a first color signal corresponding to the first color, a second color signal corresponding to the second color, and a third color signal corresponding to the third color. The grayscale of the first color signal included in the second data signal may be less than the grayscale of the first color signal included in the first data signal.

According to an embodiment of the present disclosure, the grayscale of the third color signal included in the second data signal may be less than the grayscale of the third color signal included in the first data signal.

According to an embodiment of the present disclosure, the grayscale of the second color signal included in the second data signal may be less than the grayscale of the second color signal included in the first data signal.

According to an embodiment of the present disclosure, the second display area may include: a first sub-display area and a second sub-display area. The distance between a center point of the first display area and a point in the first sub-display area may be shorter than the distance between the center point of the first display area and a point in the second sub-display area, and the point the second sub-display area may be located on a line including the central point of the first display area and the point in the first sub-display area. The panel driving block may generate a first sub-data signal by converting an image signal, which corresponds to the first sub-display area, of the second image signal based on the first sub-color coordinates in the color space. The panel driving block may generate a second sub-data signal by converting an image signal, which corresponds to the second sub-display area, of the second image signal based on the second sub-color coordinates in the color space. The second sub-color coordinates may be color coordinates obtained by shifting the first sub-color coordinates in the color space.

According to an embodiment of the present disclosure, the second sub-color coordinates may be color coordinates shifted toward the second color from the first sub-color coordinates in the color space.

According to an embodiment of the present disclosure, the panel driving block may include: a controller which generates image data including first image data and second image data based on the first image signal and the second image signal. The panel driving block may further include a source driving block which receives the image data from the controller and transmits the first data signal and the second data signal to the display panel. The controller may include a correcting unit which generates the first image data by converting the first image signal based on the first reference color coordinates, and generates the second image data by converting the second image signal based on the second reference color coordinates.

According to an embodiment of the present disclosure, the correcting unit may include: a signal dividing unit which receives an image signal from the outside and generates the first image signal and the second image signal based on the image signal and the area signal. The area signal may be a signal including information on the first display area and the second display area.

According to an embodiment of the present disclosure, the correcting unit may further include: a first signal converting unit which receives the first image signal and the first reference color coordinates, and generates the first image data by converting the first image signal based on the first reference color coordinates. The correcting unit may further include a second signal converting unit which receives the second image signal and the second reference color coordinates, and generates the second image data by converting the second image signal based on the second reference color coordinates.

According to an embodiment of the present disclosure, the correcting unit may further include a synthesis unit which receives the first image data and the second image data, and generates the image data based on the first image data and the second image data.

According to an embodiment of the present disclosure, the correcting unit may further include a color coordinate shifting unit which receives the second image signal and the first reference color coordinates, and generates the second reference color coordinates based on the second image signal and the first reference color coordinates.

According to an embodiment of the present disclosure, the panel driving block may generate the first data signal by converting the first image signal based on the first reference color coordinates. The panel driving block generates the first data signal by converting the second image signal based on the second reference color coordinates and a brightness correcting signal. The first data signal may have a first brightness, and the second data signal may have a second brightness. The second brightness may be less than the first brightness.

According to an embodiment of the present disclosure, the panel driving block may include: a controller which generates image data including first image data and second image data based on the first image signal and the second image signal. The panel driving block may further include a source driving block which receives the image data from the controller and transmits the first data signal and the second data signal to the display panel. The controller may include a correcting unit which generates the first image data by converting the first image signal based on the first reference color coordinates, and generates the second image data by converting the second image signal based on the second reference color coordinates and the brightness correcting signal.

According to an embodiment of the present disclosure, the correcting unit may include a signal dividing unit which receives an image signal from the outside and generates the first image signal and the second image signal based on the image signal and the area signal. The area signal may be a signal including information on the first display area and the second display area.

According to an embodiment of the present disclosure, the correcting unit may further include: a first signal converting unit which receives the first image signal and the first reference color coordinates, and generates the first image data by converting the first image signal based on the first reference color coordinates. The correcting unit may further include a second signal converting unit which receives the second image signal, the second reference color coordinates, and the brightness correcting signal, and generates the second image data by converting the second image signal based on the second reference color coordinates and the brightness correcting signal.

According to an embodiment of the present disclosure, the correcting unit may further include a synthesis unit which receives the first image data and the second image data, and generates the image data based on the first image data and the second image data.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
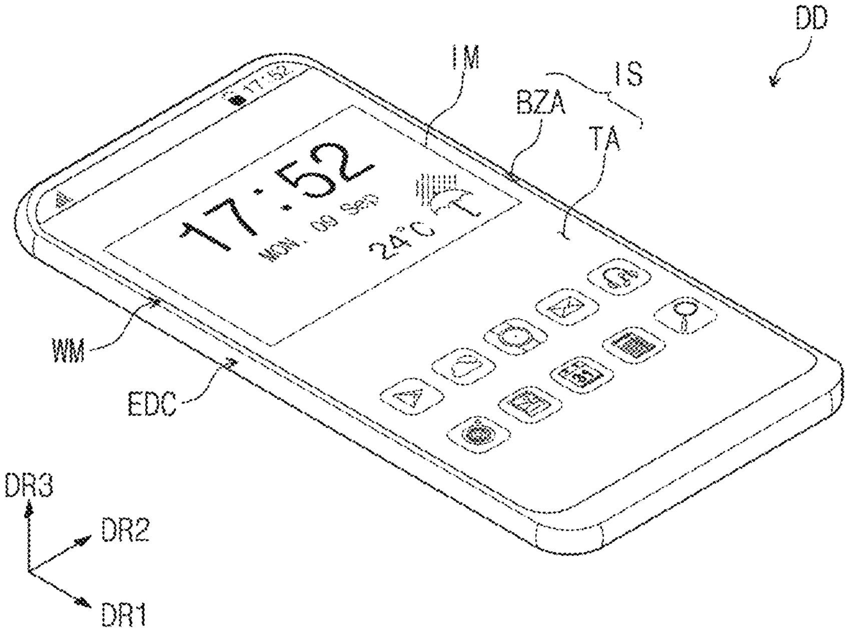
FIG. 1 is a perspective view illustrating a display device, according to an embodiment of the present disclosure.

In this specification, it will be understood that, when a component is referred to as being "on" "connected to", "coupled" to another component, it can be directly disposed on/connected to/coupled to/the another component or a third intervening component may be present therebetween.

The same reference numeral will be assigned to the same component. The thickness, ratio, and size of each components illustrated in the drawings may be exaggerated for the purpose of effectively explaining the technical content. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes any and all combinations of one or more of associated components Although the terms first, second, etc. may be used herein to describe various components, these components should not be limited by these terms. These terms are used to distinguish one component from another component. For example, a first component discussed below could be termed a second component without departing from the technical scope of the present disclosure. Similarly, the second component could be termed the first component. The singular forms are intended to include the plural forms unless the context clearly indicates otherwise In addition, the terms "under", "at a lower portion", "above", "an upper portion" are used to describe the relationship between components illustrated in drawings. The terms indicate a relative concept and described with reference to directions illustrated in the drawings It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms used herein (including technical or scientific terms) have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined herein It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the present disclosure will be described with reference to accompanying drawings.

Figure 2:
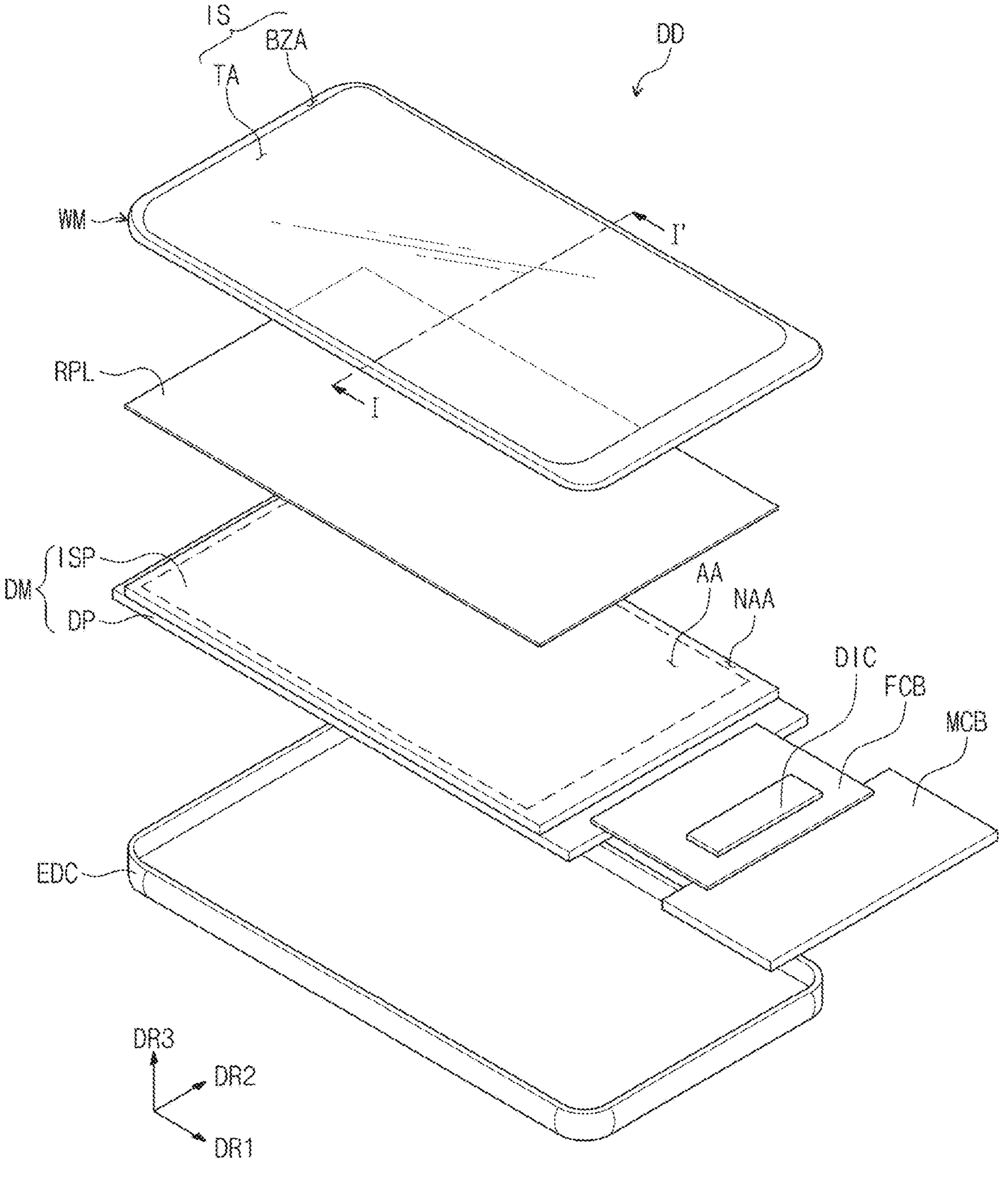
FIG. 2 is an exploded perspective view of a display device illustrated in FIG. 1.

FIG. 1 is a perspective view illustrating a display device, according to an embodiment of the present disclosure, and FIG. 2 is an exploded perspective view of a display device illustrated in FIG. 1.

Referring to FIGS. 1 and 2, a display device DD is a device activated in response to an electrical signal. The display device DD according to the present disclosure may include a large-size display device, such as a television or a monitor, or a small or medium-size display device, such as a cellular phone, a tablet, a vehicle navigation, or a game console. The above display devices are suggested for illustrative purpose, and may be employed in various electronic devices without departing from the scope of the present disclosure.

The display device DD has a rectangular shape having a longer side in a first direction DR1, and a shorter side in a second direction DR2 crossing the first direction DR1. However, the shape of the display device DD is not limited thereto, and various display devices DD having various shapes may be provided. The display device DD may display an image IM in a third direction DR3, on a display surface IS parallel to the first direction DR1 and the second direction DR2. The display surface IS, on which the image IM is displayed, may correspond to a front surface of the display device DD.

According to an embodiment, front surfaces (or top surfaces) and back surfaces (or bottom surfaces) of members are defined in a direction that the image IM is displayed. The front surface and the back surface are opposite to each other in the third direction DR3, and the direction normal to the front surface and the back surface may be parallel to the third direction DR3.

The distance between the front surface and the back surface in the third direction DR3 may correspond to the thickness of the display device DD in the third direction DR3. The first direction DR1, the second direction DR2, and the third direction DR3 may mean relative concepts and may be changed to different directions.

The display device DD may sense an external input applied from the outside. The external input may include various inputs applied from the outside of the display device DD. According to an embodiment of the present disclosure, the display device DD may sense an external input of the user, which is applied from the outside. The external input of the user may include any one of various external inputs, such as a part of a body of the user, light, heat, or pressure, or the combination thereof. In addition, the display device DD may sense the external input of the user, which is applied to the side surface or the back surface of the display device DD depending on the structures of the display device DD, and the present disclosure is not limited to any one embodiment.

The front surface of the display device DD may be divided into a transmission area TA and a bezel area BZA. The transmission area TA may be an area to display an image IM. The user views the image IM through the transmission area TA. According to the present embodiment, the transmission area TA is illustrated as being in the shape of a rectangle having rounded vertexes. However, the shape is provided for the illustrative purpose. For example, the transmission area TA may have various shapes, and the present disclosure is not limited to any one embodiment.

The bezel area BZA is adjacent to the transmission area TA. The bezel area BZA may have specific color. The bezel area BZA may surround the transmission area TA. Accordingly, the shape of the transmission area TA may be actually defined by the bezel area BZA. However, the above shape of the bezel area BZA is provided for the illustrative purpose. For example, the bezel area BZA may be disposed adjacent to only one side of the transmission area TA or may be omitted. According to an embodiment of the present disclosure, the display device DD may include various embodiments, and the present disclosure is not limited to any one embodiment.

As illustrated in FIG. 2, the display device DD may include a display module DM and a window WM disposed on the display module DM. The display module DM may include a display panel DP to display an image in response to an electrical signal, and an input sensing layer ISP to transmit/receive information on the external input.

According to an embodiment of the present disclosure, the display panel DP may include an emissive display panel. For example, the display panel DP may include an organic light emitting display panel, an inorganic light emitting display panel, a quantum dot light emitting display panel. A light emitting layer of the organic light emitting display panel may include an organic light transmitting material. A light emitting layer of the inorganic light emitting display panel may include an inorganic light emitting material. A light emitting layer of the quantum dot light emitting display panel may include a quantum dot and a quantum rod. The following description will be made that the display panel DP includes the organic light emitting display panel, according to the present embodiment.

The display panel DP may output the image IM, and the output image IM may be displayed on the display surface IS.

The input sensing layer ISP may be disposed on the display panel DP to sense the eternal input. The configuration and the operation of the input sensing layer ISP will be described with respect to FIG. 3 and FIG. 5A later.

The window WM may include a transparent material to output the image IM. For example, the window WM may include glass, sapphire, or plastic. Although the window WM is illustrated in a single layer, the present disclosure is not limited thereto. For example, the window WM may include a plurality of layers in another embodiment.

Although not illustrated, the bezel area BZA of the display device DD may be actually provided by printing one area of the window WM with a material including a specific color. According to an embodiment of the present disclosure, the window WM may include a light shielding pattern for defining the bezel area BZA. The light shielding pattern, which has the form of an organic film having a color, may be, for example, formed in a coating manner.

The window WM may be coupled to the display module DM through an adhesive film. According to an embodiment of the present disclosure, the adhesive film may include an optically clear adhesive film ("OCA"). However, the adhesive film is not limited thereto, but may include a typical adhesive agent and adhesion agent in another embodiment. For example, the adhesive film may include optically clear resin ("OCR"), or a pressure sensitive adhesive film ("PSA").

An anti-reflective layer RPL may be further interposed between the window WM and the display module DM. The anti-reflective layer RPL reduces a reflective index of external light incident from an upper portion of the window WM. According to an embodiment of the present disclosure, the anti-reflective layer RPL may include a retarder and a polarizer. The retarder may be provided in a film type or a liquid crystal coating type, and may include a 212 retarder and/or a 214 retarder. The polarizer may be provided in a film type or a liquid coating type. The film type retarder may include a stretched synthetic resin film, and the liquid crystal coating type retarder may include liquid crystals aligned in a predetermined array. The retarder and the polarizer may be implemented with one polarizing film.

According to an embodiment of the present disclosure, the anti-reflective layer RPL may include color filters. The arrangement of the color filters may be determined based on colors of light generated from a plurality of pixels PX (see FIG. 4) included in the display panel DP. The anti-reflective layer RPL may further include a light shielding pattern An active area AA and a non-active area NAA may be defined in the display module DM. The active area AA may be defined to output the image provided from the display panel DP. The active area AA may be defined as an area in which the input sensing layer ISP senses the external input applied from the outside.

The non-active area NAA may be adjacent to the active area AA. For example, the non-active area NAA may surround the active area AA. However, the shape of the non-active area NAA is provided for the illustrative purpose. For example, the non-active area NAA may have various shapes, and the present disclosure is not limited to any one embodiment. According to another embodiment, the active area AA of the display module DM may correspond to at least a portion of the transmission area TA.

The display module DM may further include a main circuit board MCB, a flexible circuit board FCB, and a driver integrated chip DIC. The main circuit board MCB may be connected with the flexible circuit board FCB and electrically connected with the display panel DP. The flexible circuit board FCB is connected with the display panel DP to electrically connect the display panel DP with the main circuit board MCB.

The main circuit board MCB may include a plurality of driving devices. The plurality of driving devices may include a circuit part to drive the display panel DP. The driver integrated chip DIC may be mounted on the flexible circuit board FCB. According to an embodiment of the present disclosure, although one flexible circuit board FCB is illustrated, the present disclosure is not limited thereto. For example, a plurality of flexible circuit boards FCBs may be provided and connected with the display panel DP in another embodiment. Although FIG. 2 illustrates the structure that the driver integrated chip DIC is mounted on the flexible circuit board FCB, the present disclosure is not limited thereto. For example, the driver integrated chip DIC may be directly mounted on the display panel DP in another embodiment. In this case, a part, on which the driver integrated chip DIC is mounted, of the display panel DP may be bent and disposed on a rear surface of the display module DM. In addition, the driver integrated chip DIC may be directly mounted on the main circuit board MCB.

The input sensing layer ISP may be electrically connected with the main circuit board MCB through the flexible circuit board FCB. However, the embodiment of the present disclosure is not limited thereto. In other words, the display module DM may additionally include an additional flexible circuit film to electrically connect the input sensing layer ISP with the main circuit board MCB in another embodiment.

The display device DD may further include an external case EDC to receive the display module DM. The external case EDC may be coupled to the window WM to define an outer appearance of the display device DD. The external case EDC may absorb the impact applied from the outside and may prevent a foreign material/moisture from being infiltrated into the display module DM to protect components received in the external case EDC. According to an embodiment, the external case EDC may be provided in the form that a plurality of receiving members are assembled.

According to an embodiment, the display device DD may further include an electronic module including various functional modules to operate the display module DM, a power supply module to supply power for the overall operation of the display device DD, and a bracket coupled to the display module DM and/or the external case EDC to split the internal space of the display device DD.

Figure 3:
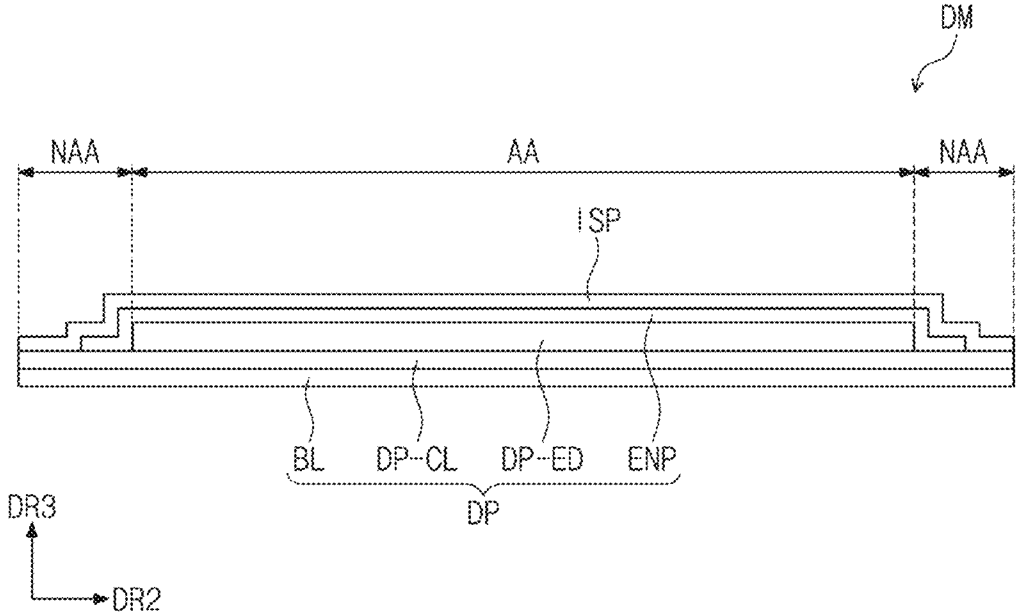
FIG. 3 is a cross-sectional view of a display module of FIG. 2.

FIG. 3 is a cross-sectional view of a display module of FIG. 2.

Referring to FIG. 3, the display module DM includes the display panel DP and the input sensing layer ISP. The display panel DP includes a base layer BL, a circuit device layer DP-CL disposed on the base layer BL, a display element layer DP-ED, and an encapsulating layer ENP. Although not illustrated, the display panel DP may further include functional layers such as an anti-reflective layer, or a reflective index adjusting layer.

The base layer BL may include at least one plastic film. The base layer BL may include a plastic substrate, a glass substrate, a metal substrate, or an organic/inorganic composite material substrate. According to an embodiment of the present disclosure, the base layer BL may include a flexible substrate. The active area AA and the non-active area NAA described with reference to FIG. 2 may be identically defined on the base layer BL.

The circuit device layer DP-CL includes at least one intermediate insulating layer and a circuit device. The intermediate insulating layer includes at least one intermediate inorganic layer and at least one intermediate organic layer. The circuit device includes signal lines, and a driving circuit for pixels.

The display element layer DP-ED includes a light emitting element. The light emitting element may include an organic light emitting diode. The display element layer DP-ED may further include an organic layer such as a pixel defining layer.

The encapsulating layer ENP encapsulates the display element layer DP-ED. The encapsulating layer ENP includes at least one inorganic layer. The encapsulating layer ENP may further include at least one organic layer. The inorganic layer protects the display element layer DP-ED from moisture/oxygen and the organic layer protects the display element layer DP-ED from the foreign materials such as dust particles. The inorganic layer may include a silicon nitride layer, a silicon oxynitride layer, a silicon oxide layer, a titanium oxide layer, or an aluminum oxide layer. The organic layer may include an acryl-based organic layer, and the present disclosure is not limited thereto.

However, according to an embodiment of the present disclosure, the display panel DP may further include an encapsulating substrate. The encapsulating substrate may be disposed to face the base layer BL on the display element layer DP-ED. The encapsulating substrate may include a plastic substrate, a glass substrate, a metal substrate, or an organic/inorganic composite material substrate. A sealant is provided between the encapsulating substrate and the base layer BL, and the encapsulating substrate and the base layer BL may be coupled to each other by the sealant. The sealant may include an organic adhesive agent or a frit such as a ceramic adhesive material. The display element layer DP-ED may be sealed by the sealant and the encapsulating substrate.

The input sensing layer ISP may be formed on the display panel DP through the sequent processes. In addition, the input sensing layer ISP and the display panel DP may be coupled to each other through an adhesive film. The input sensing layer ISP may have a multi-layer structure. The input sensing layer ISP may include a single layer insulating layer or a multi-insulating layer. According to an embodiment of the present disclosure, when the input sensing layer ISP is directly on the display panel DP through the subsequent processes, the input sensing layer ISP may be directly disposed on the encapsulating layer ENP, and the adhesive film is not interposed between the input sensing layer ISP and the display panel DP. However, according to an embodiment, the adhesive film may be interposed between the input sensing layer ISP and the display panel DP. In this case, the input sensing layer ISP and the display panel DP are not fabricated through the subsequent processes. In other words, after fabricating the input sensing layer ISP through a process separate from that of the display panel DP, the input sensing layer ISP may be fixed on a top surface of the display panel DP through the adhesive film.

When the input sensing layer ISP is directly disposed on the display panel DP through the subsequent processes, the input sensing layer ISP may be directly disposed on the encapsulating substrate. However, according to an embodiment, when the adhesive film is interposed between the input sensing layer ISP and the display panel DP, the input sensing layer ISP may be fixed to the top surface of the encapsulating substrate through the adhesive film.

Figure 4:
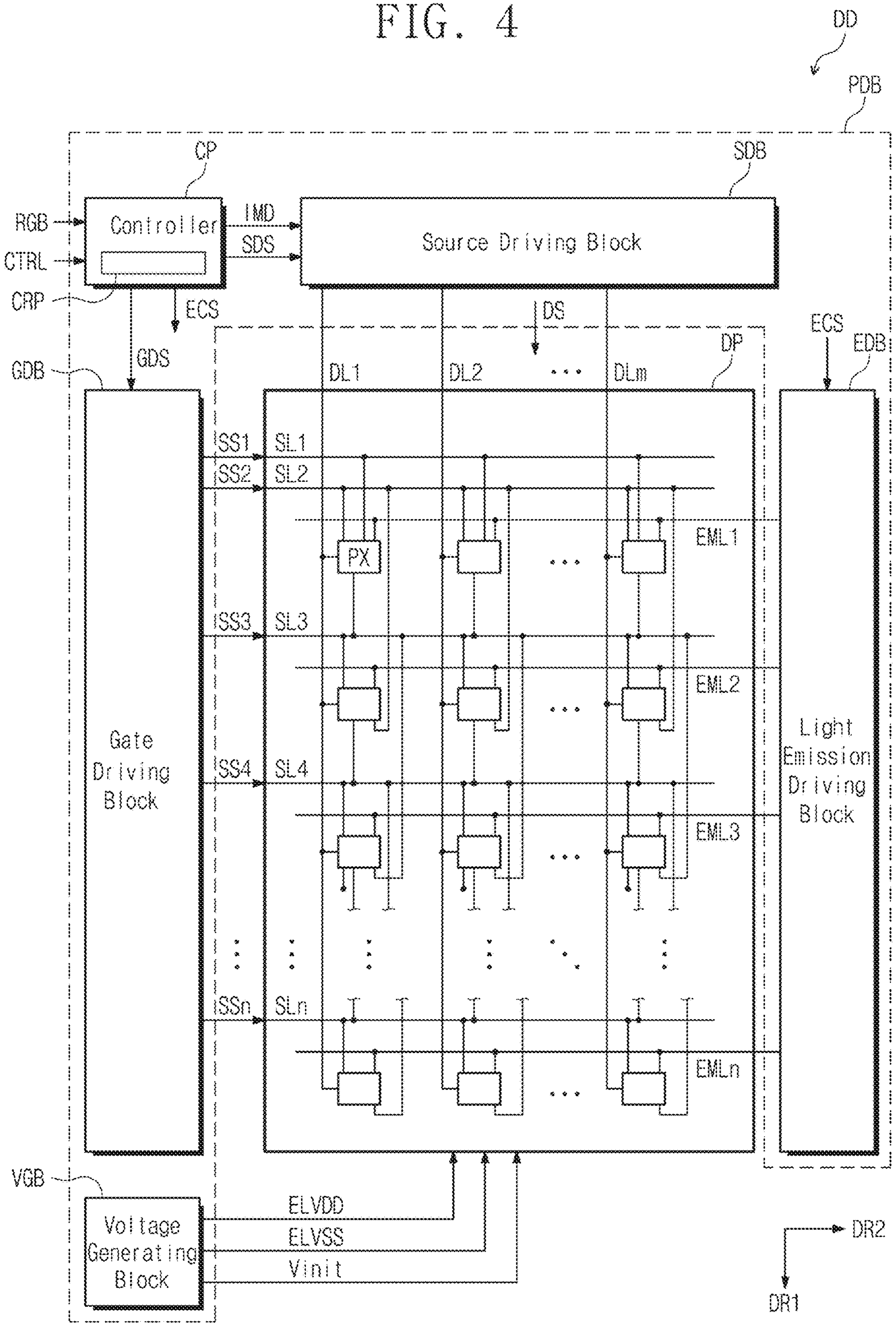
FIG. 4 is a block diagram of a display device, according to an embodiment of the present disclosure.

FIG. 4 is a block diagram illustrating the display device, according to an embodiment of the present disclosure.

Referring to FIG. 4, the display device DD includes the display panel DP and a panel driving block PDB.

According to an embodiment of the present disclosure, the panel driving block PDB includes a controller CP, a source driving block SDB, a gate driving block GDB, a light emission driving block EDB, and a voltage generating block VGB.

The controller CP receives an image signal RGB and an external control signal CTRL from the outside. The controller CP may convert a data format of the image signal RGB to be matched with the interface specification with the source driving block SDB and may generate image data IMD. The controller CP generates a source driving signal SDS, a gate driving signal GDS, and a light emitting control signal ECS in response to the external control signal CTRL. The external control signal CTRL may include a vertical synchronization signal, a horizontal synchronization signal, and a main clock.

The controller CP may transmit the image data IMD and the source driving signal SDS to the source driving block SDB. The source driving signal SDS may include a horizontal start signal to start the operation of the source driving block SDB. The source driving block SDB generates a data signal DS based on the image data IMD, in response to the source driving signal SDS. The source driving block SDB outputs the data signal DS to a plurality of data lines DL1 to DLm to be described later. The data signal DS is an analog voltage corresponding to a grayscale value of the image data IMD.

The controller CP transmits the gate driving signal GDS to the gate driving block GDB. The gate driving signal GDS may include a vertical start signal for starting the operation of the gate driving block GDB, and a scan clock signal for determining timing to output scan signals SS1 to SSn. The gate driving block GDB generates the scan signals SS1 to SSn based on the gate driving signal GDS. The gate driving block GDB outputs the scan signals SS1 to SSn to a plurality of scan lines SL1 to SLn to be described later.

The light emission driving block EDB receives the light emitting control signal ECS from the controller CP. The light emission driving block EDB may output light emitting control signals to light emitting lines EML1 to EMLn in response to the light emitting control signal ECS.

The voltage generating block VGB generates voltages for the operation of the display panel DP. According to an embodiment of the present disclosure, the voltage generating block VGB generates a first driving voltage ELVDD, a second driving voltage ELVSS, and an initialization voltage Vinit. According to an embodiment, the voltage generating block VGB may operate under the control of the controller CP. According to an embodiment of the present disclosure, the voltage level of the first driving voltage ELVDD is greater than the voltage level of the second driving voltage ELVSS. According to an embodiment of the present disclosure, the voltage level of the first driving voltage ELVDD may be in the range of about 20 voltages (V) to about 30 V. The voltage level of the initialization voltage Vinit is less than the voltage level of the second riving voltage ELVSS. According to an embodiment of the present disclosure, the voltage level of the initialization voltage Vinit may be in the range of about 1 V to about 9 V.

According to an embodiment of the present disclosure, the display panel DP includes the plurality of scan lines SL1 to SLn, the plurality of data lines DL1 to DLm, the plurality of light emitting lines EML1 to EMLn, and the plurality of pixels PX.

The scan lines SL1 to SLn are arranged to extend in the second direction DR2 from the gate driving block GDB and to be spaced apart from each other in the first direction DR1. The data lines DL1 to DLm are arranged to extend in the first direction DR1 from the source driving block SDB and to be spaced apart from each other in the second direction DR2.

Each of the pixels PX is electrically connected to three corresponding scan lines among the scan lines SL1 to SLn. Each of the pixels PX is electrically connected to a corresponding light emitting line of the light emitting lines EML1 to EMLn and a corresponding data line of the data lines DL1 to DLm. However, according to an embodiment of the present disclosure, the connection relation among the pixels PX, the scan lines SL1 to SLn, the data lines DL1 to DLm, and the light emitting lines EML1 to EMLn may be changed depending on the configuration of the driving circuit of the pixels PX.

Each of the pixels PX includes a light emitting element and a pixel circuit part to control the emission of light from the light emitting element. The pixel circuit part may include a plurality of transistors and a capacitor. Each of the pixels PX receives the first driving voltage ELVDD, the second driving voltage ELVSS, and the initialization voltage Vinit.

The pixels PX may include a plurality of groups including light emitting elements which emit light having mutually different colors. According to an embodiment of the present disclosure, the pixels PX may include first pixels to express a first color PC1 having a first wavelength (see FIG. 8), second pixels to express a second color PC2 having a second wavelength shorter than the first wavelength (see FIG. 8), and third pixels to express a third color PC3 having a third wavelength shorter than each of the first and second wavelengths (see FIG. 8). According to an embodiment of the present disclosure, the first color PC1 may be red, the second color PC2 may be green, and the third color PC3 may be blue. The light emitting element of the first pixel, the light emitting element of the second pixel, and the light emitting element of the third pixel may include light emitting layers including different materials.

The panel driving block PDB may further include a correcting unit CRP. According to an embodiment of the present disclosure, the correcting unit CRP may be included in the controller CP. The correcting unit CRP may adjust color coordinates of the image IM (see FIG. 1) displayed on the display panel DP to reduce power consumption of the display device DD. The correcting unit CRP may adjust the color coordinates and the brightness of the image IM displayed on the display panel DP. According to an embodiment of the present disclosure, the correcting unit CRP may adjust color coordinates of the image IM displayed on an outer area of the display panel DP. The correcting unit CRP may adjust the color coordinates and the brightness of the image displayed on the outer area of the display panel DP. In detail, the correcting unit CRP may adjust at least one of the color coordinates or the brightness of the image IM displayed on the outer area of the display panel DP depending on light emission efficiency of light emitting elements included in the pixels PX.

Hereinafter, the configuration and the operation of the correcting unit CRP will be described in detail with reference to FIGS. 6A to 12.

Figure 5A:
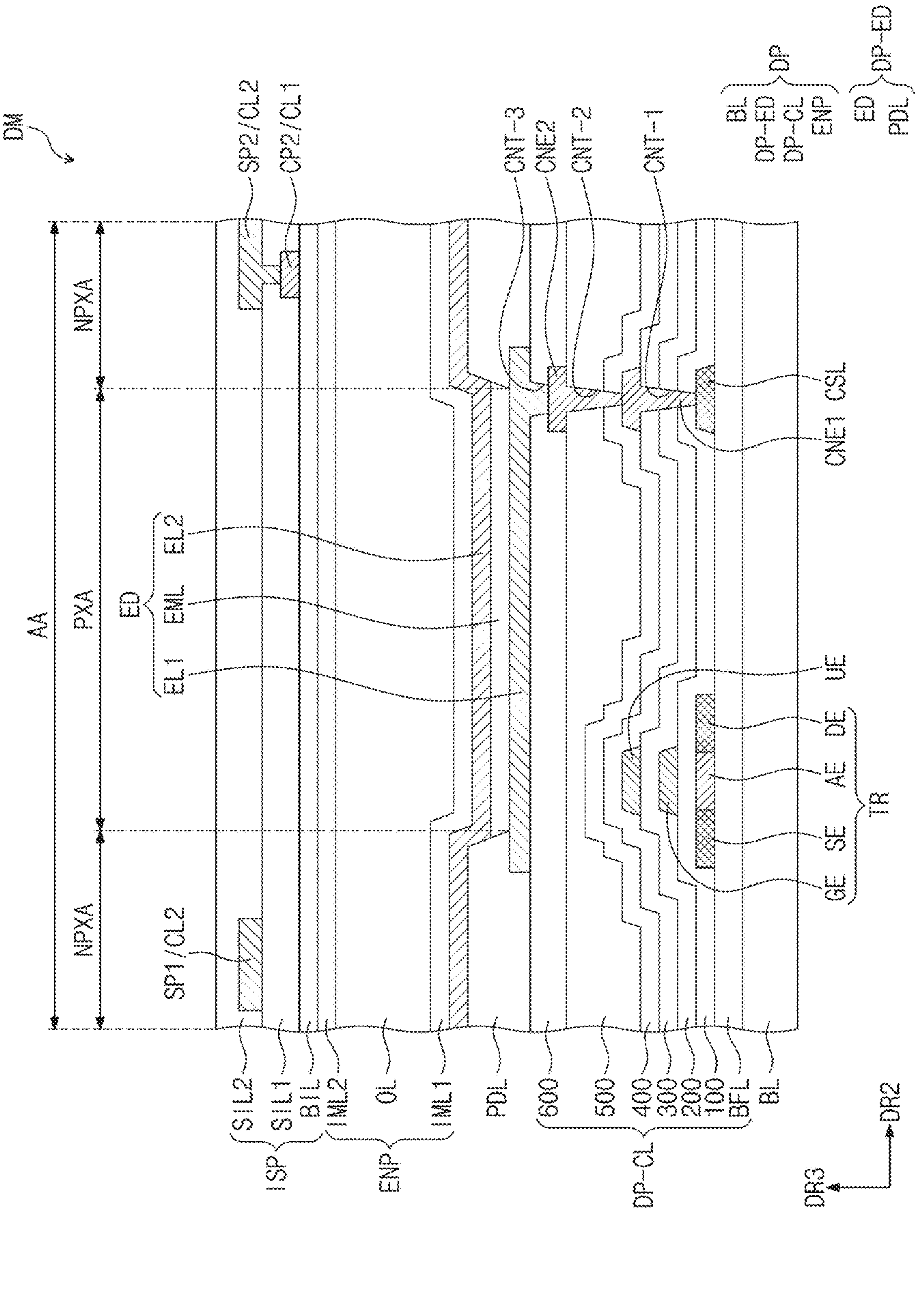
FIGS. 5A and 5B are cross-sectional views taken along a partial area of a display module, according to an embodiment of the present disclosure.
Figure 5B:
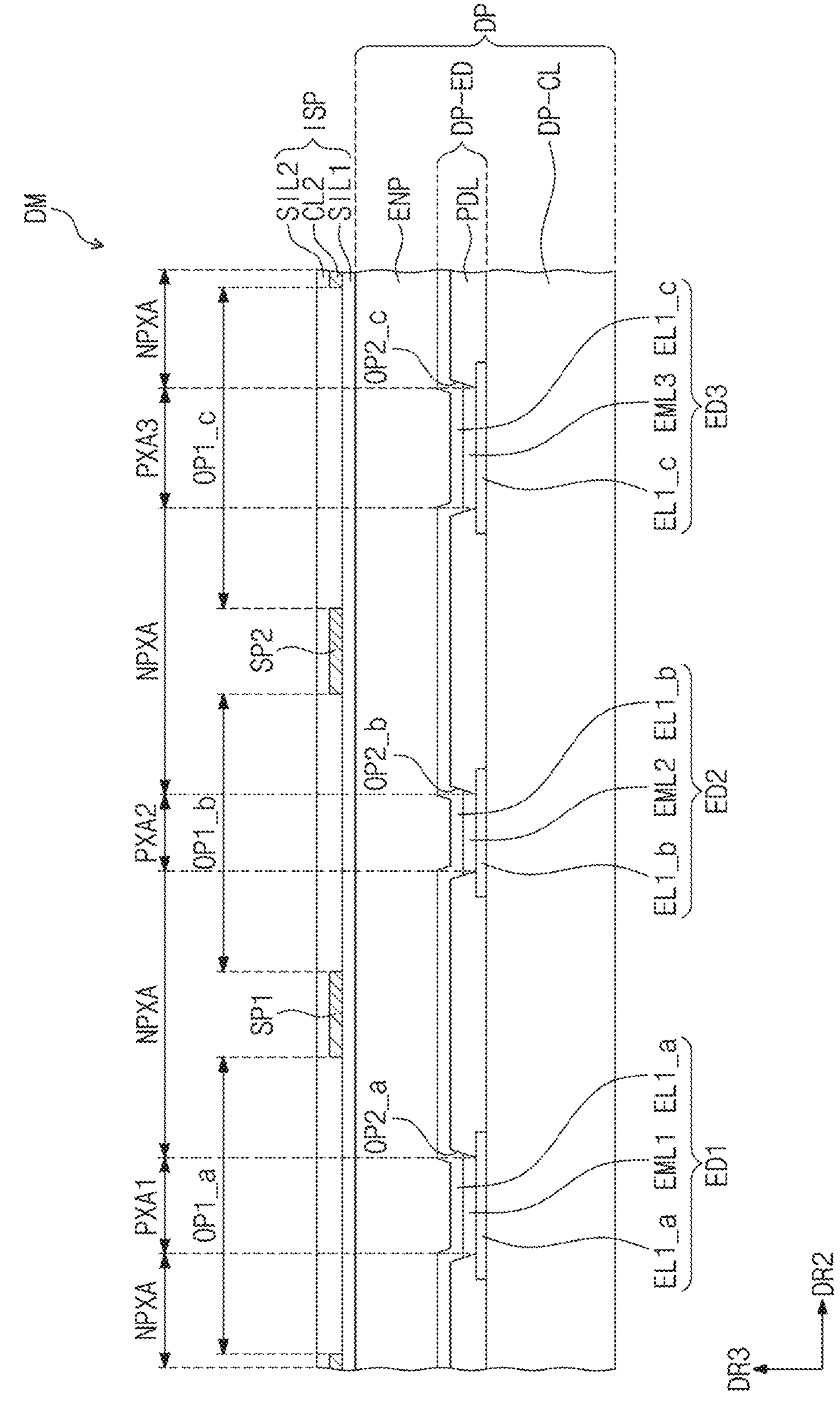

FIGS. 5A and 5B are cross-sectional views taken along a partial area of a display module, according to an embodiment of the present disclosure.

Referring to FIG. 5A, the display module DM includes the display panel DP and the input sensing layer ISP. The display panel DP includes the base layer BL, the circuit device layer DP-CL, the display element layer DP-ED, and the encapsulating layer ENP.

According to an embodiment of the present disclosure, the base layer BL may include a synthetic resin layer. The synthetic resin layer may include a thermosetting resin. The base layer BL may have a multi-layer structure. For example, the base layer BL may have a three-layer structure of a synthetic resin layer, an adhesive layer, and a synthetic resin layer. In particular, the synthetic resin layer may be a polyimide-based resin layer, and the material of the synthetic resin layer is not specifically limited. The synthetic resin layer may include at least one of acrylic resins, methacrylic resins, polyisoprene, vinyl resins, epoxy resins, urethane resins, cellulose resins, siloxane resins, polyamide resins, and perylene resins. The base layer BL may include a glass substrate, a metal substrate, or an organic/inorganic composite material substrate.

At least one inorganic layer may be disposed on a top surface of the base layer BL. The inorganic layer may include at least one of an aluminum oxide, a titanium oxide, a silicon oxide, a silicon oxynitride, a zirconium oxide, and a hafnium oxide. The inorganic layer may be in multiple layers. The multiple inorganic layers may constitute a barrier layer and/or a buffer layer. According to the embodiment, the circuit device layer DP-CL is illustrated as including a buffer layer BFL.

The circuit device layer DP-CL may include a plurality of intermediate insulating layers, a semiconductor pattern, a conductive pattern, a signal line. The intermediate insulating layer, the semiconductor layer, and the conductive layer may be formed through a coating process and a depositing process. Thereafter, the intermediate insulating layer, the semiconductor layer, and the conductive layer may be selectively patterned through a photolithography process. The semiconductor pattern, the conductive pattern, and the signal line included in the circuit device layer DP-CL may be formed in such a manner.

The circuit device layer DP-CL may include the buffer layer BFL, a first intermediate insulating layer 100, a second intermediate insulating layer 200, a third intermediate insulating layer 300, a fourth intermediate insulating layer 400, a fifth intermediate insulating layer 500, and a sixth intermediate insulating layer 600.

The buffer layer BFL may improve bonding force between the base layer BL and the semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, the embodiment is not limited thereto. For example, the semiconductor pattern may include amorphous silicon or a metal oxide in another embodiment.

FIG. 5A illustrates only some semiconductor patterns, and semiconductor patterns may be further disposed in another area of a pixel when viewed on a plan view. The semiconductor patterns may be arranged in a specific rule across pixels. The semiconductor pattern may have a different electrical property depending on whether the semiconductor pattern is doped. The semiconductor pattern may include a first semiconductor area having higher conductivity and a second semiconductor area having lower conductivity. The first semiconductor area may be doped with N-type dopants or P-type dopants. A P-type transistor includes a doping area doped with the P-type dopants. The second semiconductor area may be a non-doped area or may be doped with a lighter concentration, as compared to the first semiconductor area.

The conductivity of the first semiconductor area may be greater than conductivity of the second semiconductor area, and may actually serve as an electrode or a signal line. The second semiconductor area actually corresponds to a channel (or active) area of a transistor. In other words, a portion of the semiconductor pattern may be the channel area of the transistor, and another portion of the semiconductor pattern may be a source area or a drain area of the transistor. In addition, another portion of the semiconductor pattern may be a connection electrode or a connection signal line.

As illustrated in FIG. 5A, a source area SE, a channel area AE, and a drain area DE of a transistor TR are formed from the semiconductor pattern. The source area SE and the drain area DE may extend in opposite directions from the channel area AE, when viewed from the cross-sectional view. FIG. 5A illustrates a portion of a connection signal line CSL formed from the semiconductor pattern. Although not illustrated in FIG. 5A, the connection signal line CSL may be electrically connected with the drain area DE of the transistor TR, when viewed on a plan view.

The first intermediate insulating layer 100 is disposed on the buffer layer BFL. The first intermediate insulating layer 100 commonly overlaps the plurality of pixels and covers the semiconductor pattern in a plan view. The first intermediate insulating layer 100 may be an inorganic layer and/or an organic layer, and may have a single layer structure or a multi-layer structure. The first intermediate insulating layer 100 may include at least one of an aluminum oxide, a titanium oxide, a silicon oxide, a silicon oxynitride, a zirconium oxide, and a hafnium oxide. According to the present embodiment, the first intermediate insulating layer 100 may be a single layer silicon oxide layer. Each of the second to sixth intermediate insulating layers 200, 300, 400, 500 and 600 as well as the first intermediate insulating layer 100 may be an inorganic layer and/or an organic layer, and may have a single layer structure or a multi-layer structure. The inorganic layer may include at least one of the above-described materials.

A gate GE of the transistor TR is disposed on the first intermediate insulating layer 100. The gate GE may be a portion of the metal pattern. The gate GE may overlap the channel area AE in a plan view. The gate GE may function as a mask in a process of doping the semiconductor pattern.

The second intermediate insulating layer 200 is disposed on the first intermediate insulating layer 100 to cover the gate GE. The second intermediate insulating layer 200 may commonly overlap the pixels in a plan view. The second intermediate insulating layer 200 may be an inorganic layer and/or an organic layer, and may have a single layer structure or a multi-layer structure. According to the present embodiment, the second intermediate insulating layer 200 may be a single layer silicon oxide layer.

An upper electrode UE is disposed on the second intermediate insulating layer 200. The upper electrode UE may overlap the gate GE in a plan view. The upper electrode UE may be a portion of the metal pattern. A portion of the gate GE and an upper electrode UE overlapping the portion of the gate GE in a plan view may define a capacitor. According to an embodiment of the present disclosure, the upper electrode UE may be omitted.

A third intermediate insulating layer 300 is disposed on the second intermediate insulating layer 200 to cover the upper electrode UE. The third intermediate insulating layer 300 may commonly overlap pixels in a plan view. The third intermediate insulating layer 300 may be an inorganic layer and/or an organic layer, and may have a single layer structure or a multi-layer structure. According to the present embodiment, the third intermediate insulating layer 300 may be a single layer silicon oxide layer.

A first connection electrode CNE1 may be disposed on the third intermediate insulating layer 300. The first connection electrode CNE1 may be connected with the connection signal line CSL through a first contact hole CNT-1 penetrating the first intermediate insulating layer 100, the second intermediate insulating layer 200, and the third intermediate insulating layer 300.

The fourth intermediate insulating layer 400 may be disposed on the third intermediate insulating layer 300. The fourth intermediate insulating layer 400 may be a single layer silicon oxide layer.

The fifth intermediate insulating layer 500 is disposed on the fourth intermediate insulating layer 400. The fifth intermediate insulating layer 500 may be an organic layer. A second connection electrode CNE2 may be disposed on the fifth intermediate insulating layer 500. The second connection electrode CNE2 may be connected with the first connection electrode CNE1 through a second contact hole CNT-2 penetrating the fourth intermediate insulating layer 400 and the fifth intermediate insulating layer 500.

The sixth intermediate insulating layer 600 is disposed on the fifth intermediate insulating layer 500 to cover the second connection electrode CNE2. The sixth intermediate insulating layer 600 may be an organic layer.

The display element layer DP-ED may be disposed on the circuit device layer DP-CL. According to an embodiment of the present disclosure, the display element layer DP-ED may include a light emitting element ED and a pixel defining layer PDL.

The light emitting element ED includes a first electrode EL1 disposed on the circuit device layer DP-CL, a light emitting layer EML disposed on the first electrode EL1, and a second electrode EL2 disposed on the light emitting layer EML.

The first electrode EL1 is disposed on the sixth intermediate insulating layer 600. The first electrode EL1 is connected with the second connection electrode CNE2 through a third contact hole CNT-3 penetrating the sixth intermediate insulating layer 600.

The pixel defining layer PDL is disposed on the sixth intermediate insulating layer 600 to cover a portion of the first electrode ELL A pixel opening part is defined in the pixel defining layer PDL. The pixel opening part exposes at least a portion of the first electrode EL1. According to an embodiment of the present disclosure, a light emitting area PXA may correspond to a partial area, which is exposed by the pixel opening part, of the first electrode EL1. A non-light emitting area NPXA may surround the light emitting area PXA.

The light emitting layer EML is disposed on the first electrode ELL The light emitting layer EML may be disposed in an area corresponding to the pixel opening part. In other words, the light emitting layer EML may be divided for each pixel and disposed. The light emitting layer EML may include a light emitting material including a fluorescent material or a phosphor. The light emitting material may include an organic light emitting material or an inorganic light emitting material, but the present disclosure is not limited to any one of the organic light emitting material or the inorganic light emitting material.

The second electrode EL2 is disposed on the light emitting layer EML. The second electrode EL2 is provided in the form of one common electrode, and commonly disposed in the plurality of pixels.

According to an embodiment of the present disclosure, the light emitting element ED may further include a hole control layer and an electron control layer. The hole control layer may be interposed between the first electrode EL1 and the light emitting layer EML, and may further include a hole injection layer. The electron control layer may be interposed between the light emitting layer EML and the second electrode EL2, and may further include an electron injection layer.

The encapsulating layer ENP may be disposed on the display element layer DP-ED. The encapsulating layer ENP may be disposed on the second electrode EL2.

The encapsulating layer ENP is commonly disposed in the plurality of pixels. According to an embodiment of the present disclosure, the encapsulating layer ENP may directly cover the second electrode EL2. According to an embodiment of the present disclosure, a capping layer may be further interposed between the encapsulating layer ENP and the second electrode EL2 to cover the second electrode EL2. In this case, the encapsulating layer ENP may directly cover the capping layer.

The encapsulating layer ENP may include a first inorganic layer IML1, an organic layer OL, and a second inorganic layer IML2. The first inorganic layer IML1 and the second inorganic layer IML2 protect the light emitting element ED from moisture and oxygen, and the organic layer OL protects the light emitting element ED from a foreign substance such as a dust particle. The first inorganic layer IML1 and the second inorganic layer IML2 may include a silicon nitride layer, a silicon oxynitride layer, a silicon oxide layer, a titanium oxide layer, or an aluminum oxide layer. The organic layer OL may include an acryl-based organic layer, and the present disclosure is not limited thereto.

The first inorganic layer IML1 may be disposed on the light emitting element ED. The organic layer OL is disposed on the first inorganic layer IML1. The second inorganic layer IML2 may be disposed on the organic layer OL.

The input sensing layer ISP may be disposed on the display panel DP. The input sensing layer ISP may include a base insulating layer BIL, a first conductive layer CL1, a first sensing insulating layer SILL a second conductive layer CL2, and a second sensing insulating layer SIL2. According to an embodiment of the present disclosure, the first sensing insulating layer SIL1 and the second sensing insulating layer SIL2 may be an inorganic layer and/or an organic layer, and may have a single layer structure or multi-layer structure.

The base insulating layer BIL may be directly disposed on the encapsulating layer ENP. For example, the base insulating layer BIL may directly make contact with the second inorganic layer IML2. The base insulating layer BIL may have a single layer structure or a multi-layer structure.

The first conductive layer CL1 may be disposed on the base insulating layer BIL. The first sensing insulating layer SIL1 may be disposed on the first conductive layer CL1. The first sensing insulating layer SIL1 may be an inorganic layer and/or an organic layer, and may have a single layer structure or a multi-layer structure.

The second conductive layer CL2 may be disposed on the first sensing insulating layer SILL Each of the first conductive layer CL1 and the second conductive layer CL2 may have a single layer structure or a multi-layer structure stacked in the third direction DR3. The conductive layer having the single layer structure may include an electrode layer or a transparent conductive layer.

The first conductive layer CL1 and the second conductive layer CL2 may include first sensor parts SP1, second sensor parts SP2, first connection parts, and second connection parts CP2. According to an embodiment of the present disclosure, the first conductive layer CL1 may include second connection parts CP2. The second conductive layer CL2 may include first sensor parts SP1, second sensor parts SP2, and first connection parts. However, the first conductive layer CL1 may include the first sensor parts SP1, the second sensor parts SP2, and the first connection parts, and the second conductive layer CL2 may include second connection parts CP2.

The second sensing insulating layer SIL2 may be disposed on the second conductive layer CL2. The second sensing insulating layer SIL2 may be an inorganic layer and/or an organic layer, and may have a single layer structure or a multi-layer structure.

FIG. 5B illustrates a plurality of light emitting elements ED1, ED2, and ED3. Hereinafter, the same reference numerals will be assigned to the same components as those described with reference to FIG. 5A, and the duplicated description will be omitted. In addition, although the base insulating layer BIL and the second connection parts CP2 are not illustrated in FIG. 5B, the input sensing layer ISP may include the base insulating layer BIL and the second connection parts CP2 as illustrated in FIG. 5A. For the convenience of explanation, the encapsulating layer ENP and the circuit device layer DP-CL are illustrated in brief.

FIG. 5B illustrates that the first light emitting element ED1 to express a first color having a first wavelength band, the second light emitting element ED2 to express a second color having a second wavelength band different from the first wavelength band, and the third light emitting element ED3 to express a third color having a third wavelength band different from the first wavelength band and the second wavelength band. The light emitting element ED illustrated in FIG. 5A may be one of the first light emitting element ED1, the second light emitting element ED2, and the third light emitting element ED3. According to an embodiment of the present disclosure, the second wavelength may be shorter than the first wavelength. The third wavelength may be shorter than each of the first wavelength and the second wavelength. According to an embodiment of the present disclosure, the first color may be red, the second color may be green, and the third color may be blue.

A light emitting area PXA1, in which the first light emitting element ED1 is disposed, is defined as a first light emitting area PXA1, the light emitting area PXA2, in which the second light emitting element ED2 is disposed, is a second light emitting area PXA2, and a light emitting area PXA3, in which the third light emitting element ED3 is disposed, is defined as a third light emitting area PXA3. The light emitting area PXA1 illustrated in FIG. 5A may be one of the first light emitting area PXA1, the second light emitting area PXA2, and the third light emitting area PXA3.

The area of each of the first light emitting area PXA1, the second light emitting area PXA2, and the third light emitting area PXA3 may be varied depending on the color of light generated by the first light emitting element ED1, the second light emitting element ED2, and the third light emitting element ED3. The area of each of the first light emitting area PXA1, the second light emitting area PXA2, and the third light emitting area PXA3 may be determined depending on the types of light emitting layers EML1, EML2, and EML3 included in the light emitting elements ED1, ED2, and ED3, respectively. According to an embodiment of the present disclosure, when the first color is red, the second color is green, and the third color is blue, the area of the third light emitting area PXA3 may be greater than each of the area of the first light emitting area PXA1 and the area of the second light emitting area PXA2, and the area of the first light emitting area PXA1 may be greater than the area of the second light emitting area PXA2. This is because the highest light emission efficiency is represented in the light emitting element to emit green light among the light emitting element emitting red light, the light emitting element emitting green light, and the light emitting element emitting blue light, and the lowest light emission efficiency is represented in the light emitting element emitting blue light among the light emitting element emitting red light, the light emitting element emitting green light, and the light emitting element emitting blue light. However, although the areas of the first light emitting area PXA1, the second light emitting area PXA2, and the third light emitting area PXA3 are varied according to an embodiment of the present disclosure, the present disclosure is not limited thereto. The first light emitting area PXA1, the second light emitting area PXA2, and the third light emitting area PXA3 may have equal areas in another embodiment. The following description will be described regarding the reduction of power consumption of the display device DD by utilizing that the light emitting elements ED1, ED2, and ED3 produce mutually different light emitting efficiencies.

Figure 6A:
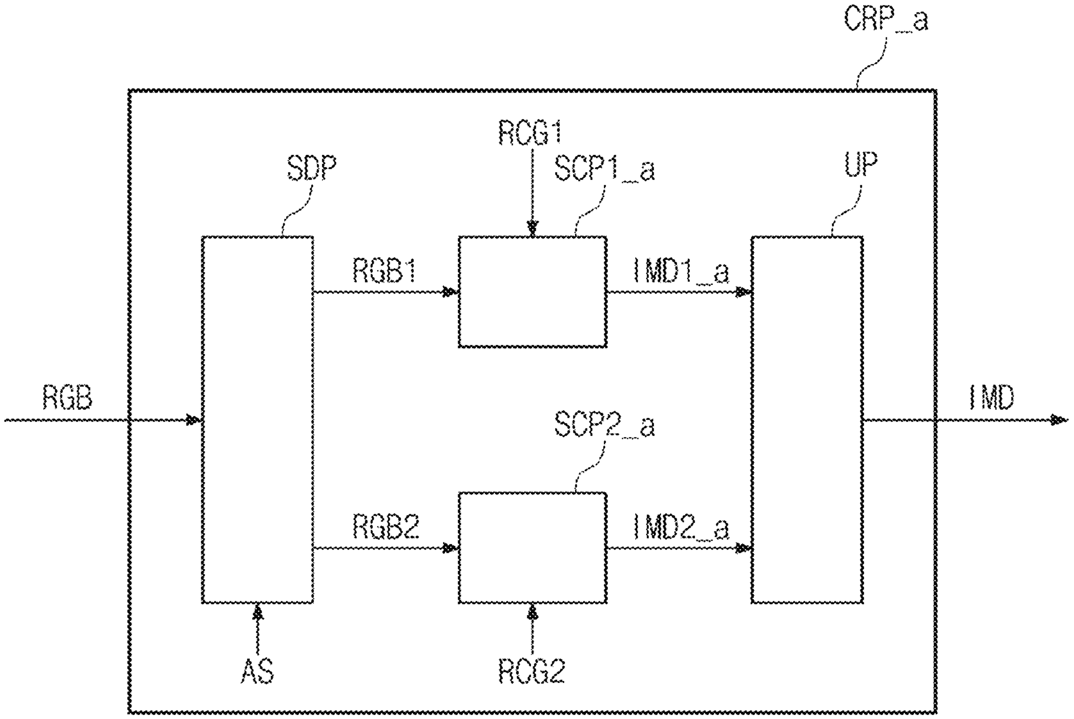
FIGS. 6A and 6B are block diagrams illustrating the structure of a correcting unit, according to an embodiment of the present disclosure.
Figure 6B:
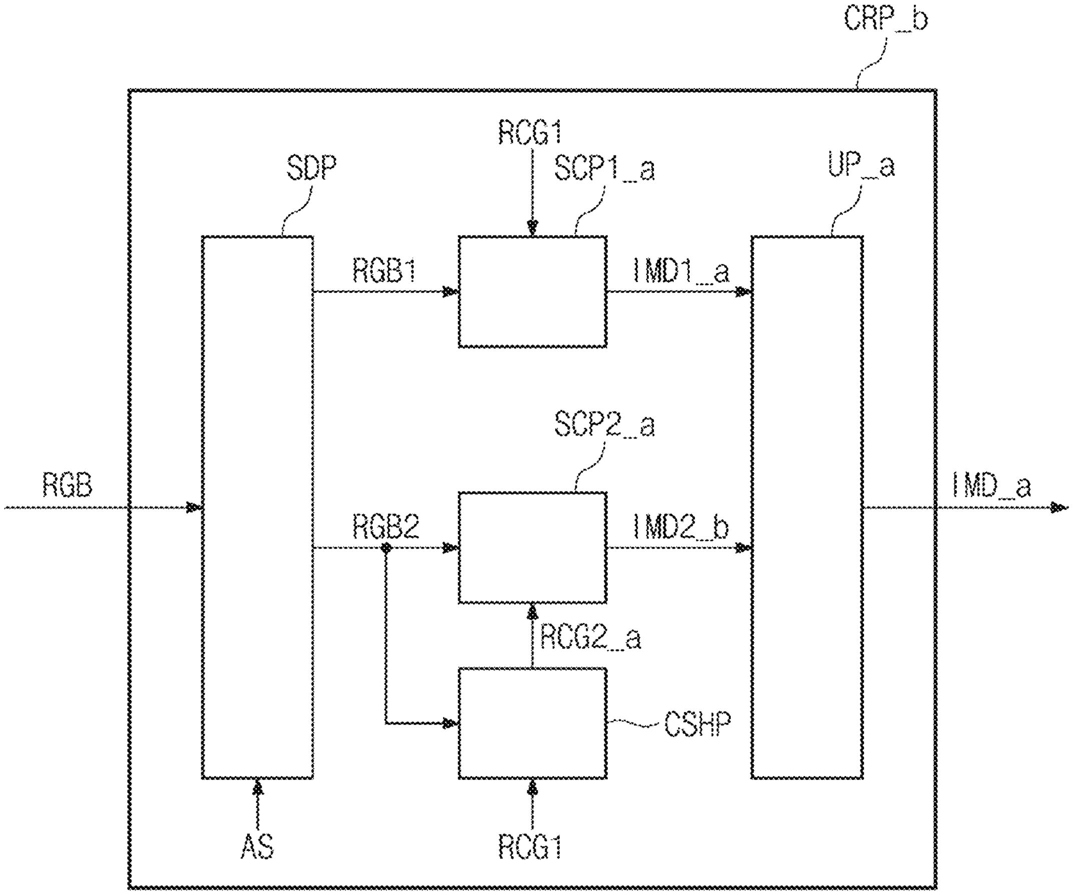
Figure 7:
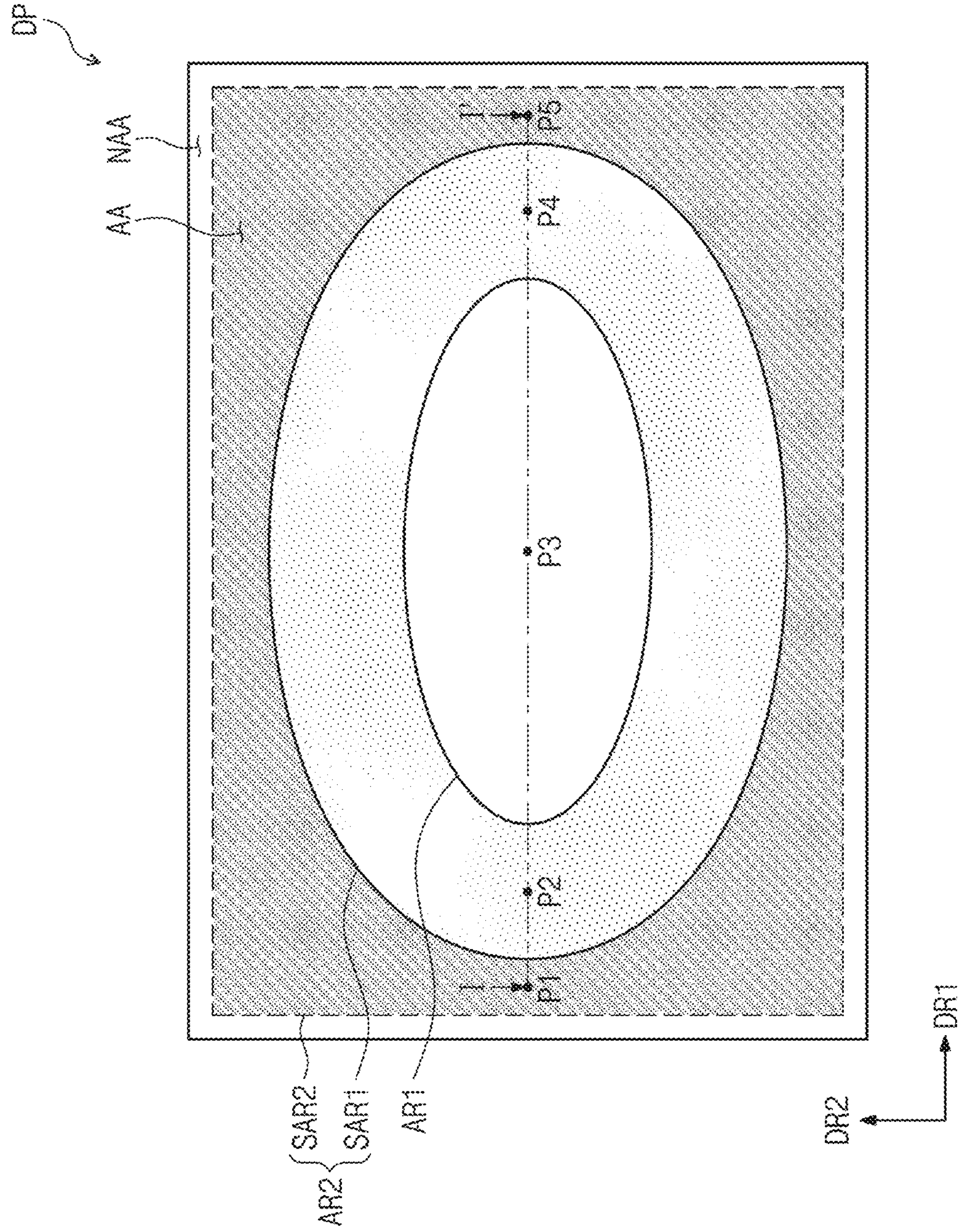
FIG. 7 is a view schematically illustrating the operation of a correcting unit, according to an embodiment of the present disclosure.
Figure 8:
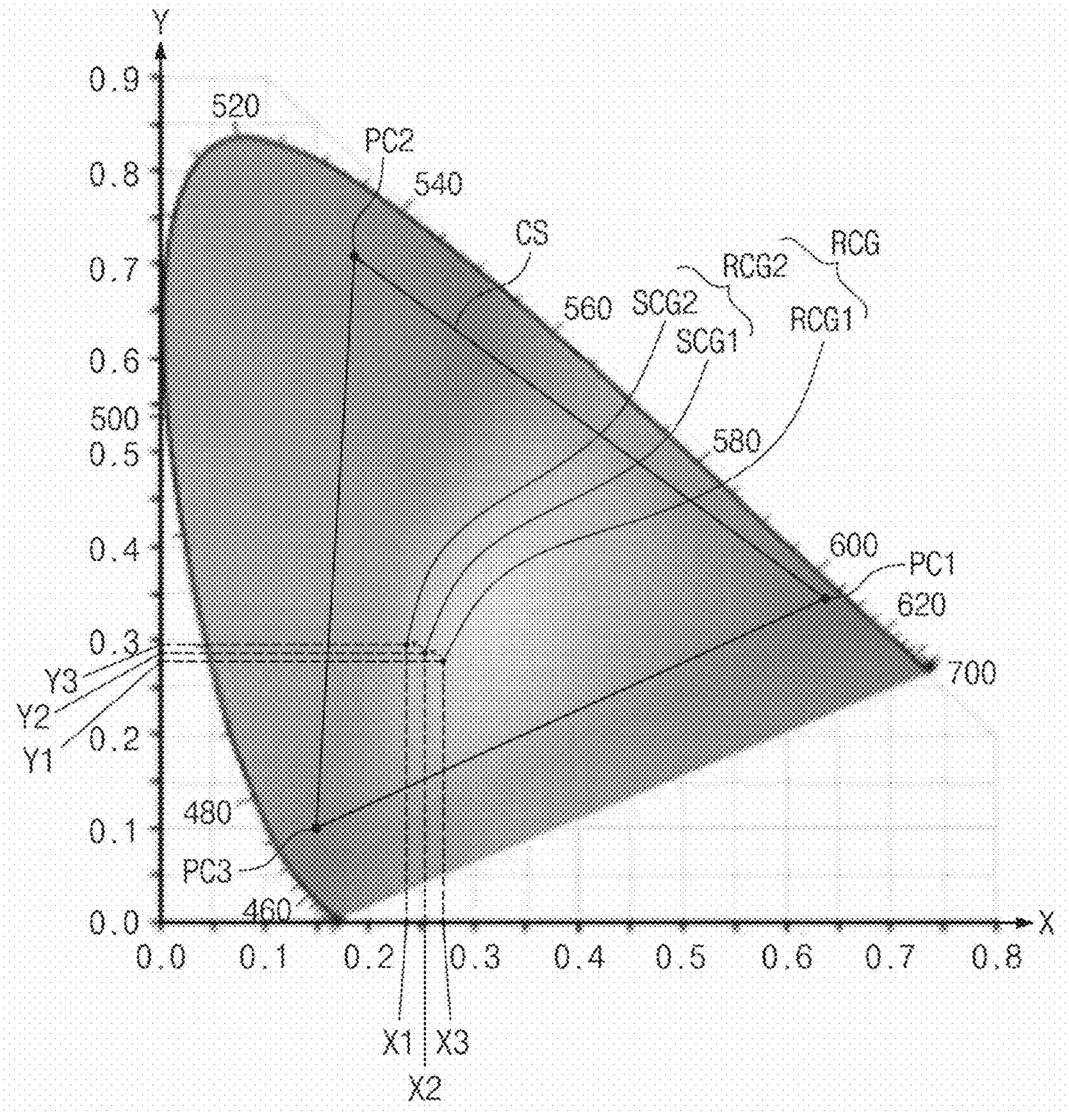
FIG. 8 is a graph illustrating a shift of second reference color coordinates according to an embodiment of the present disclosure.

FIGS. 6A and 6B are block diagrams illustrating the structure of a correcting unit, according to an embodiment of the present disclosure. FIG. 7 is a view schematically illustrating the operation of a correcting unit, according to an embodiment of the present disclosure. FIG. 8 is a graph illustrating a shift of a reference color coordinates, according to an embodiment of the present disclosure.

Referring to FIG. 6A, a correcting unit CRP_a includes a signal dividing unit SDP, a first signal converting unit SCP1_*a*, a second signal converting unit SCP2_*a*, and a synthesis unit UP.

According to an embodiment of the present disclosure, the correcting unit CRP_a may receive the image signal RGB, may convert a first image signal RGB1 included in the image signal RGB based on first reference color coordinates RCG1 to generate first Image data IMD1_*a*. The correcting unit CRP_a may receive the image signal RGB, may convert a second image signal RGB2 included in the image signal RGB based on second reference color coordinates RCG2 to generate the second image data IMD2_*a*. The correcting unit CRP_a generates image data IMD including the first image data IMD1_*a* and the second image data IMD2_*a*. The correcting unit CRP_a transmits the image data IMD to the source driving block SDB (see FIG. 4).

Referring to FIG. 7, the active area AA includes a first display area AR1 and a second display area AR2. According to an embodiment of the present disclosure, the first display area AR1 may be an area corresponding to the central portion of the display panel DP, and the second display area AR2 may be an area adjacent to the first display area AR1. The second display area AR2 may be an area corresponding to an outer portion of the display panel DP. The second display area AR2 may include a plurality of sub-display areas SAR1 and SAR2. According to an embodiment of the present disclosure, the second display area AR2 may include a first sub-display area SAR1 and a second sub-display area SAR2. The first sub-display area SAR1 may be interposed between the first display area AR1 and the second sub-display area SAR2. The distance between the central point of the first display area AR1 and a point in the first sub-display area SAR1 may be shorter than the distance between the central point of the first display area AR1 and a point in the second sub-display area SAR2 which is located on a line including the central point of the first display area AR1 and the point in the first sub-display area SAR1. In other words, the first sub-display area SAR1 may surround the first display area AR1, and the second sub-display area SAR2 surrounds the first sub-display area SAR1.

Although FIG. 7 illustrates that the first display area AR1 has an oval shape, the first sub-display area SAR1 adjacent to the first display area AR1 is formed in an oval ring structure to surround the first display area AR1. However, the present disclosure is not limited thereto. For example, the first display area AR1 may have a polygonal shape, and the first sub-display area SAR1 may have a polygonal ring shape corresponding to the shape of the first display area AR1 in another embodiment. However, the first sub-display area SAR1 may have various shapes regardless of the shape of the first display area AR1 in another embodiment.

The signal dividing unit SDP of FIG. 6A receives the image signal RGB and an area signal AS from the outside. The signal dividing unit SDP generates the first image signal RGB1 and the second image signal RGB2, based on the image signal RGB and the area signal AS.

The area signal AS may be a signal including information on the first display area AR1 and the second display area AR2. The first image signal RGB1 may be an image signal, which corresponds to the first display area AR1, of the image signal RGB. The second image signal RGB2 may be an image signal, which corresponds to the second display area AR2, of the image signal RGB. According to an embodiment of the present disclosure, the area signal AS may further include information on the first sub-display area SAR1 and the second sub-display area SAR2. The second image signal RGB2 may include a first sub-image signal and a second sub-image signal. The first sub-image signal may be an image signal, which corresponds to the first sub-display area SAR1, of the second image signal RGB2. The second sub-image signal may be an image signal, which corresponds to the second sub-display area SAR2, of the second image signal RGB2. When the second display area AR2 is divided into the first sub-display area SAR1 and the second sub-display area SAR2, the signal dividing unit SDP may generate the first image signal RGB1, the first sub-image signal, and the second sub-image signal, based on the image signal RGB and the area signal AS.

FIG. 8 illustrates CIE 1931 color space and color space CS that is able to be expressed on the display panel DP (see FIG. 1) according to the present disclosure. In FIG. 8, an x axis shows X color coordinates, and a y axis shows Y color coordinates. Colors included in the color space CS of FIG. 8 have X color coordinate values and Y color coordinate values.

Vertexes of the color space CS may be color coordinates of primary colors PC1, PC2, and PC3. The primary colors PC1, PC2, and PC3 include a first primary color PC1, a second primary color PC2, and a third primary color PC3. The first primary color PC1 may be red, the second primary color PC2 may be green, and the third primary color PC3 may be blue. The first primary color PC1 may be defined as a color including a first color component corresponding to red and not including a second color component and a third color component corresponding to green and blue, respectively. The second primary color PC2 may be defined as a color including a second color component corresponding to green and not including the first color component and the third color component corresponding to red and blue, respectively. The third primary color PC3 may be defined as a color including the third color component corresponding to blue and not including the first color component and the second color component corresponding to red and green, respectively.

First reference color coordinates RCG1 for serving as a reference when the image signal RGB is converted into the image data IMD is shown in the color space CS. The first reference color coordinates RCG1 has a third X color coordinate X3 and a first Y color coordinate Y1. According to an embodiment of the present disclosure, the first reference color coordinates RCG1 may be color coordinates of white. According to an embodiment of the present disclosure, white may refer to a color including the first primary color PC1, the second primary color PC2, and the third primary color PC3.

According to an embodiment of the present disclosure, second reference color coordinates RCG2 are shown in the color space CS. The second reference color coordinates RCG2 may be color coordinates obtained by shifting the first reference color coordinates RCG1 toward the second primary color PC2. The X color coordinate of the second reference color coordinates RCG2 may be less than the third X color coordinate X3 of the first reference color coordinates RCG1. The Y color coordinate of the second reference color coordinates RCG2 may be greater than the first Y color coordinate Y1 of the first reference color coordinates RCG1.

According to an embodiment of the present disclosure, the second reference color coordinates RCG2 includes first sub-color coordinates SCG1 and second sub-color coordinates SCG2. The first sub-color coordinates SCG1 have a second X color coordinate X2 and a second Y color coordinate Y2. The second sub-color coordinates SCG2 have a first X color coordinate X1 and a third Y color coordinate Y3. According to an embodiment of the present disclosure, the third X color coordinate X3 may be greater than the second X color coordinate X2. The second X color coordinate X2 may be greater than the first X color coordinate X1. The first Y color coordinate Y1 may be less than the second Y color coordinate Y2. The second Y color coordinate Y2 may be less than the third Y color coordinate Y3.

The first sub-color coordinates SCG1 may be color coordinates obtained by shifting the first reference color coordinates RCG1 toward the second primary color PC2 in the color space CS. The second sub-color coordinates SCG2 may be color coordinates obtained by shifting the first sub-color coordinates SCG1 toward the second primary color PC2 in the color space CS.

The first signal converting unit SCP1_*a* of FIG. 6A receives the first image signal RGB1 and the first reference color coordinates RCG1, and generates the first image data IMD1_*a* by converting the first image signal RGB1 based on the first reference color coordinates RCG1. The second signal converting unit SCP2_*a* receives the second image signal RGB2 and the second reference color coordinates RCG2, and generates the second image data IMD2_*a* by converting the second image signal RGB2 based on the second reference color coordinates RCG2. According to an embodiment of the present disclosure, when the second display area AR2 includes the first sub-display area SAR1 and the second sub-display area SAR2, the second reference color coordinates RCG2 include the first sub-color coordinates SCG1 and the second sub-color coordinates SCG2. When the second reference color coordinates RCG2 include the first sub-color coordinates SCG1 and the second sub-color coordinates SCG2, the second image data IMD2_*a* may include a first sub-data signal and a second sub-data signal. The second signal converting unit SCP2_*a* may generate the first sub-data signal by converting the first sub-image signal based on the first sub-color coordinates SCG1. The second signal converting unit SCP2_*a* may generate the second sub-data signal by converting the second sub-image signal based on the second sub-color coordinates SCG2.

The first reference color coordinates RCG1 and the second reference color coordinates RCG2 of FIG. 6A may be preset values received by the correcting unit CRP_a from the outside.

The synthesis unit UP receives the first image data IMD1_*a* and the second image data IMD2_*a*, and generates the image data IMD based on the first image data IMD1_*a* and the second image data IMD2_*a*. The synthesis unit UP transmits the image data IMD to the source driving block SDB (see FIG. 4).

The source driving block SDB may generate the data signal DS (see FIG. 4), based on the image data IMD. The data signal DS includes a first data signal and a second data signal. The first data signal is a data signal generated based on the first image data IMD1_*a*. The second data signal is a data signal generated based on the second image data IMD2_*a*.

The first data signal and the second data signal include a first color signal corresponding to the first color, a second color signal corresponding to the second color, and a third color signal corresponding to the third color, respectively. The first image data IMD1_*a* is generated based on the first reference color coordinates RCG1, and the second image data IMD2_*a* is generated based on the second reference color coordinates RCG2 obtained by shifting the first reference color coordinates RCG1 toward the second primary color PC2. Accordingly, even if the ratios among the first color, the second color, and the third color included in the first image signal RGB1 are equal to the ratios among the first color, the second color, and the third color included in the second image signal RGB2, the proportion of the second color signal in the second data signal generated based on the second image data IMD2_*a* is greater than the proportion of the second color signal in the first data signal generated based on the first image data IMD1_*a*. Accordingly, the grayscale of the first color included in the second data signal is less than the grayscale of the first color included in the first data signal. Accordingly, the grayscale of the third color included in the second data signal is less than the grayscale of the third color included in the first data signal. The grayscale of the second color included in the second data signal may be greater than the grayscale of the second color included in the first data signal. However, according to an embodiment of the present disclosure, the grayscale of the second color included in the second data signal may be equal to the grayscale of the second color included in the first data signal. In this case, the second brightness of the image corresponding to the second data signal may be less than the first brightness of the image corresponding to the first data signal.

X color coordinates and the Y color coordinates of the first reference color coordinates RCG1 and the second reference color coordinates RCG2 are changed depending on the positions of the first display area AR1 and the second display area AR2 in the display panel DP, which will be described later with reference to FIG. 9. Power consumption of the display device DD is reduced, as the second image data IMD2_*a* is generated based on the second reference color coordinates RCG2 obtained by shifting the first reference color coordinates RCG1 toward the second primary color PC2 in the color space CS, which will be described later with reference to FIG. 10.

Referring to FIG. 6B, a correcting unit CRP_b may further include a color coordinate shifting unit CSHP. Hereinafter, the details of components the same as those described with reference to FIG. 6A will be omitted.

The color coordinate shifting unit CSHP receives the second image signal RGB2 from the signal dividing unit SDP and receives the first reference color coordinates RCG1 from the outside. The color coordinate shifting unit CSHP may convert the first reference color coordinates RCG1 into a second reference color coordinates RCG2_*a* based on the second image signal RGB2. The color coordinate shifting unit CSHP may determine an extent of shifting the first reference color coordinates RCG1 toward the second primary color PC2 to generate the second reference color coordinates RCG2_*a* by analyzing the ratios among the first color, the second color, and the third color included in the second image signal RGB2.

According to an embodiment of the present disclosure, as the proportion of the second color included in the second image signal RGB2 increases, the extent of shifting the first reference color coordinates RCG1 toward the second primary color PC2 may increase. Accordingly, the correcting unit CRP_b may generate second image data IMD2_*b* through second reference color coordinates RCG2 corresponding to the image IM (see FIG. 1) displayed on the display panel DP (see FIG. 2). Accordingly, the power consumption of the display device DD (see FIG. 1) is significantly reduced depending on the image IM displayed on the display panel DP.

Figures 9, 10:
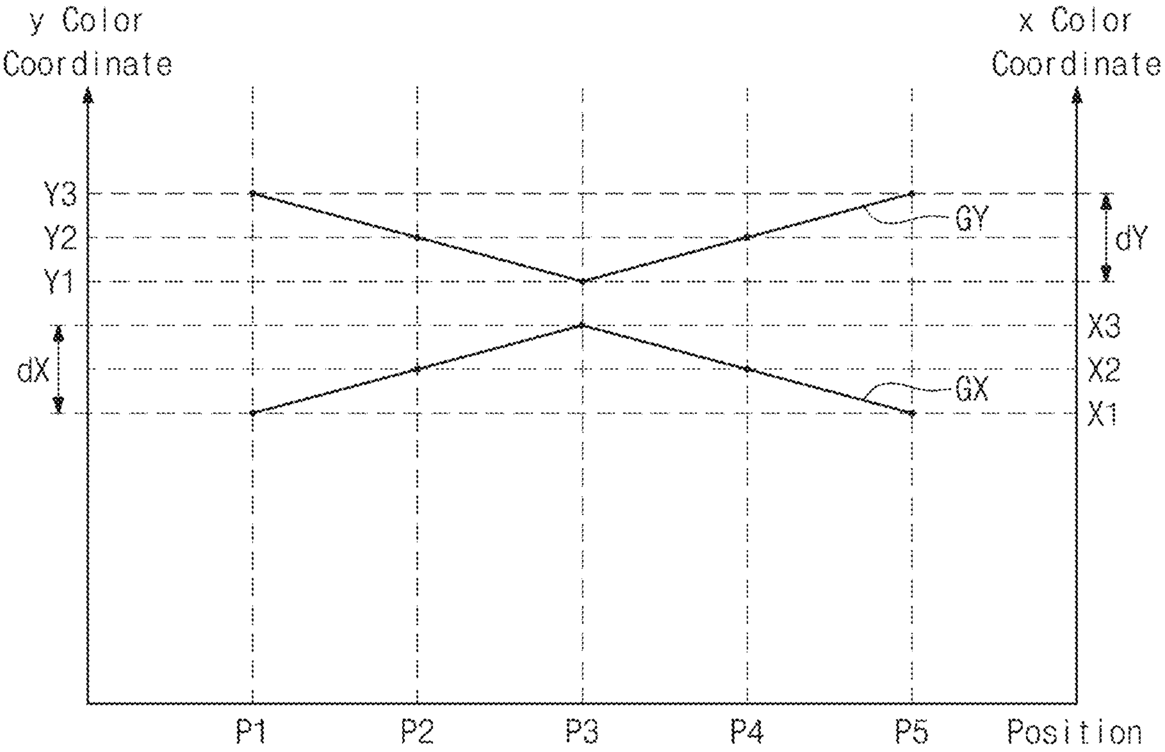
FIG. 9 is a graph illustrating second reference color coordinates shifted depending on the position of a display panel, according to an embodiment of the present disclosure.
FIG. 10 is a table illustrating the power consumption of a display device, which is reduced as second reference color coordinates are shifted, according to an embodiment of the present disclosure.

FIG. 9 is a graph illustrating reference color coordinates shifted depending on the position of a display panel, according to an embodiment of the present disclosure.

Referring to FIGS. 7 and 9, the first display area AR1 may be an area corresponding to the central portion of the display panel DP, and the second display area AR2 may be an area adjacent to the first display area AR1 and corresponding to the outer portion of the display panel DP. The second display area AR2 includes the first sub-display area SAR1 and the second sub-display area SAR2.

FIG. 7 illustrates first to fifth points P1, P2, P3, P4, and P5, which are virtual points, in the display panel DP. The first to fifth points P1, P2, P3, P4, and P5 are arranged in the first direction DR1. The first point P1 and the fifth point P5 are positioned within the second sub-display area SAR2. The second point P2 and the fourth point P4 are positioned within the first sub-display area SAR1. The third point P3 is positioned within the first display area AR1. The third point P3 may be the center point of the first display area AR1. According to an embodiment of the present disclosure, the distance between the third point P3 and the second point P2, and the distance between the third point P3 and the fourth point P4 may be shorter than the distance between the third point P3 and the first point P1 and the distance between the third point P3 and the fifth point P5, respectively.

FIG. 9 illustrates an X color coordinate GX and a Y color coordinate GY of each of the first reference color coordinates RCG1 (see FIG. 8), the first sub-color coordinates SCG1 (see FIG. 8) and the second sub-color coordinates SCG2 (see FIG. 8) depending on the position of the display panel DP. According to an embodiment of the present disclosure, the first reference color coordinates RCG1 is the reference when the image signal RGB1 (see FIG. 6A), which is displayed at the third point P3, is converted into the first image data IMD1_*a* (see FIG. 6A). The first sub-color coordinates SCG1 are a reference when the image signal RGB2 (see FIG. 6A) displayed at the second point P2 and the fourth point P4 is converted into the second image data IMD2_*a* (see FIG. 6A). The second sub-color coordinates SCG2 is a reference when the image signal RGB2 displayed at the first point P1 and the fifth point P5 is converted into the second image data IMD2_*a*

When viewed based on the third X color coordinate X3 of the first reference color coordinates RCG1 corresponding to the third point P3, the X color coordinates of the first and second sub-color coordinates SCG1 and SCG2 decrease, as the corresponding position is far away from the third point P3. When viewed based on the first Y color coordinate Y1 of the first reference color coordinates RCG1 corresponding to the third point P3, the Y color coordinates of the first and second sub-color coordinates SCG1 and SCG2 increase, as the corresponding position is far away from the third point P3. Referring to FIG. 8, the first and second sub-color coordinates SCG1 and SCG2 are shifted toward the second primary color PC2, as the corresponding position is far away from the third point P3.

According to an embodiment of the present disclosure, a difference value between the first reference color coordinates RCG1 and the second reference color coordinates RCG2 may be less than a preset reference difference value. A difference value between the first reference color coordinates RCG1 and the first sub-color coordinates SCG1 and a difference value between the first reference color coordinates RCG1 and the second sub-color coordinates SCG2 each may be less than a preset reference difference value. The reference difference value may include a first difference value for the X color coordinate and a second difference value for the Y color coordinate. In this case, the reference difference value may be defined as a difference value between color coordinates, which allows a user of the display device DD to start recognizing the difference between a color of an image displayed on the central portion of the display panel DP and a color of an image displayed on the outer portion of the display panel DP. According to an embodiment of the present disclosure, the difference value dX between the third X color coordinate X3 of the first reference color coordinates RCG1 and the first X color coordinate X1 of the second sub-color coordinates SCG2 is less than the first difference value for the X color coordinate of the reference difference value. According to an embodiment of the present disclosure, the difference value dY between the first Y color coordinate Y1 of the first reference color coordinates RCG1 and the third Y color coordinate Y3 of the second sub-color coordinates SCG2 is less than the second difference value for the Y color coordinate of the reference difference value.

FIG. 10 is a table illustrating the power consumption of a display device, which is reduced as reference color coordinates are shifted, according to an embodiment of the present disclosure.

FIG. 10 illustrates a light emission efficiency (unit: candelas per ampere [cd/A]) of the display device DD for each of an X color coordinate and a Y color coordinate of the image IM (see FIG. 1) displayed on the display panel DP (see FIG. 2). The light emission efficiency (cd/A) of the display device DD may be an average value of the light emission efficiencies of the first to third light emitting elements ED1, ED2, and ED3 (see FIG. 5B).

Referring to FIGS. 8 and 10, for the same X color coordinate of the image IM, as the Y color coordinate of the image IM increases, the light emission efficiency of the display device DD increases. For the same Y color coordinate of the image IM, as the X color coordinate of the image IM decreases, the light emission efficiency of the display device DD increases. As the color coordinates of the image IM is more shifted toward the second primary color PC2 in the color space CS, the light emission efficiency of the display device DD increases. Accordingly, as the second reference color coordinates RCG2, which serve as the reference when the image signal RGB is converted into the image data IMD_a, are obtained by shifting the first reference color coordinates RCG1 toward the second primary color PC2, the light emission efficiency of the display device DD increases.

Referring to FIGS. 9 and 10, an image, which is based on the second reference color coordinates RCG2 obtained by shifting the first reference color coordinates RCG1 toward the second primary color PC2, is displayed on the outer portion of the display device DD, thereby enhancing the light emission efficiency of the display device DD while reducing the power consumption of the display device DD.

Figure 11:
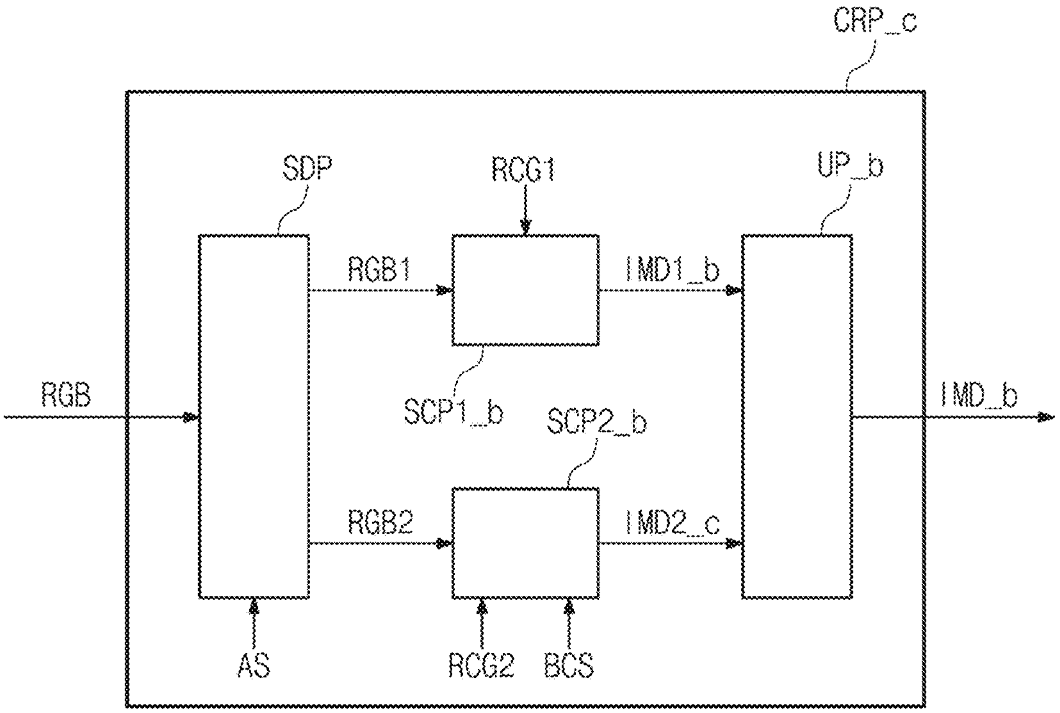
FIG. 11 is a block diagram illustrating the structure of a correcting unit, according to an embodiment of the present disclosure.
Figure 12:
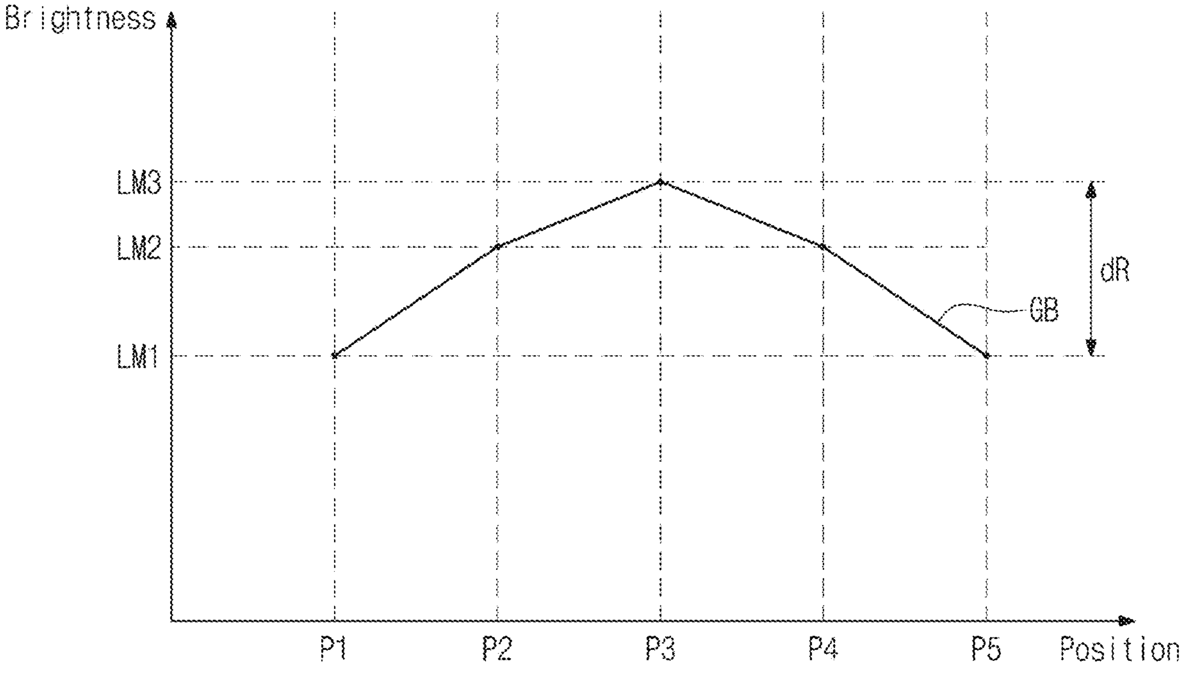
FIG. 12 is a graph illustrating the brightness of an image, depending on the position of a display panel, according to an embodiment of the present disclosure.

FIG. 11 is a block diagram illustrating the structure of a correcting unit, according to an embodiment of the present disclosure. FIG. 12 is a graph GB illustrating the brightness of an image, depending on the position of a display panel, according to an embodiment of the present disclosure. Hereinafter, the same reference numerals will be assigned to the same components as those described with reference to FIG. 6A, and the duplicated description will be omitted.

Referring to FIG. 11, a correcting unit CRP_c includes a signal dividing unit SDP, a first signal converting unit SCP1_*b*, a second signal converting unit SCP2_*b*, and a synthesis unit UP_b.

The first signal converting unit SCP1_*b* receives the first image signal RGB1 and the first reference color coordinates RCG1. The first signal converting unit SCP1_*b* generates the first image data IMD1_*b* by converting the first image signal RGB1 based on the first reference color coordinates RCG1.

The second signal converting unit SCP2_*b* receives the second image signal RGB2, the second reference color coordinates RCG2, and a brightness correcting signal BCS. The second signal converting unit SCP2_*b* generates a second image data IMD2_*c* by converting the second image signal RGB2 based on the second reference color coordinates RCG2 and the brightness correcting signal BCS.

The brightness correcting signal BCS may be a preset value received from the outside by the correcting unit CRP_c. According to an embodiment of the present disclosure, the grayscale data of the second image data IMD2_*c* generated based on the brightness correcting signal BCS may be less than the grayscale data of the first image data IMD1_*b*.

The correcting unit CRP_a generates image data IMD b based on the first image data IMD1_*b* and the second image data IMD2_*c*. The synthesis unit UP_b transmits the image data IMD b to the source driving block SDB (see FIG. 4).

The source driving block SDB may generate the data signal DS (see FIG. 4) based on the image data IMD b. The data signal DS includes a first data signal and a second data signal. The first data signal is a data signal generated based on the first image data IMD1_*b*. The second data signal is a data signal generated based on the second image data IMD2_*c*.

The first data signal includes a first brightness, and the second data signal includes a second brightness. The first image data IMD1_*b* is generated based on the first reference color coordinates RCG1, and the second image data IMD2_*c* is generated based on the second reference color coordinates RCG2 and the brightness correcting signal BCS. According to an embodiment of the present disclosure, the brightness correcting signal BCS is a correction signal for lowering the brightness of an image displayed on the second display area AR2 (see FIG. 7). Accordingly, the second brightness included in the second data signal generated based on the second image data IMD2_*c* is less than the first brightness included in the first data signal generated based on the first image data IMD1_*b*.

Referring to FIGS. 7 and 12, a graph illustrating the brightness of an image for each position of the display panel DP is shown. The brightness of the image displayed on the display panel DP decreases, as the image (see FIG. 1) is farther away from the third point P3, when viewed based on a third brightness LM3 of the image displayed at the third point P3 corresponding to the central portion of the display panel DP. A second brightness LM2 at the second point P2 and the fourth point P4 is less than the third brightness LM3 at the third point P3. The first brightness LM1 at the first point P1 and the fifth point P5 is less than the second brightness LM2 at the second point P2 and the fourth point P4. As the brightness of the display panel DP decreases, the power consumed in the first light emitting element ED1, the second light emitting element ED2, and the third light emitting element ED3 (see FIG. 5B) decreases, and thus, the power consumption of the display device DD (see FIG. 1) may decrease.

According to an embodiment of the present disclosure, a difference value dR between the third brightness LM3 and the first brightness LM1 may be less than a preset reference difference value. In this case, the brightness difference value dR may be defined as a brightness difference value, which allows a user of the display device DD to start recognizing the difference between the brightness of an image displayed on the central portion of the display panel DP and the brightness of an image displayed on the outer portion of the display panel DP.

Referring to FIG. 9 and FIG. 12, the second reference color coordinates RCG2 (see FIG. 8) corresponding to the outer portion of the display panel DP, which makes it more difficult for a user to recognize the difference in the color or the brightness of the image IM as compared to the central portion of the display panel DP, is shifted toward the second primary color PC2, thereby reducing the power consumption of the display device DD while preventing the user from recognizing the difference in color of the image IM. In addition, the brightness of the image displayed on the outer portion of the display panel DP is allowed to decrease, thereby more reducing the power consumption of the display device DD while preventing the user from recognizing the difference in the color and brightness of the image IM. In detail, the second reference color coordinates RCG2 may be shifted toward the second primary color PC2 in the color space CS and the brightness of the image IM may decrease, from the central portion toward the outer portion of the display panel DP.

As used in connection with various embodiments of the disclosure, the term "unit" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

According to the present disclosure, the power consumption of the display device may be reduced by adjusting the color coordinates and the brightness of the image displayed on the outer portion of the display panel DP depending on the light emission efficiency of the light emitting element.

Although an embodiment of the present disclosure has been described for illustrative purposes, those skilled in the art will appreciate that various modifications, and substitutions are possible, without departing from the scope and spirit of the invention as disclosed in the accompanying claims.

Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a first display area and a second display area; and a panel driving block which provides, to the first display area, a first data signal generated by converting a first image signal, which corresponds to the first display area, based on first reference color coordinates in a color space, and provides, to the second display area, a second data signal generated by converting a second image signal, which corresponds to the second display area, based on second reference color coordinates in the color space, wherein the second reference color coordinates are color coordinates obtained by shifting the first reference color coordinates in the color space, each of the first image signal and the second image signal includes a first color signal corresponding to a first color, a second color signal corresponding to a second color, and a third color signal corresponding to a third color, when ratios among the first to third color included in the first image signal are equal to ratios among the first to third color included in the second image signal, ratios among the first to third color signals of the first data signal are different from ratios among the first to third color signals of the second data signals.

2. The display device of claim 1, wherein the first display area corresponds to a central portion of the display panel, and wherein the second display area is adjacent to the first display area.

3. The display device of claim 2, wherein the color space includes:

the first color having a first wavelength, the second color having a second wavelength shorter than the first wavelength, and the third color having a third wavelength shorter than the second wavelength, and wherein the second reference color coordinates are color coordinates obtained by shifting the first reference color coordinates toward the second color in the color space.

4. The display device of claim 3, wherein the display panel includes:

a display element layer including a plurality of light emitting elements, and wherein the light emitting elements include:

a first light emitting element which emits the first color;

a second light emitting element which emits the second color; and a third light emitting element which emits the third color.

5. The display device of claim 4, wherein the first light emitting element has a first light emission efficiency, wherein the second light emitting element has a second light emission efficiency greater than the first light emission efficiency, and wherein the third light emitting element has a third light emission efficiency less than the first light emission efficiency.

6. The display device of claim 5, wherein a grayscale of the first color signal included in the second data signal is less than the grayscale of the first color signal included in the first data signal, and wherein a grayscale of the third color signal included in the second data signal is less than the grayscale of the third color signal included in the first data signal.

7. The display device of claim 6, wherein a grayscale of the second color signal included in the second data signal is equal to the grayscale of the second color signal included in the first data signal.

8. The display device of claim 6, wherein a grayscale of the second color signal included in the second data signal is greater than the grayscale of the second color signal included in the first data signal.

9. The display device of claim 3, wherein the second display area includes:

a first sub-display area and a second sub-display area, wherein a distance between a central point of the first display area and a point in the first sub-display area is shorter than a distance between the central point of the first display area and a point the second sub-display area, and the point the second sub-display area is located on a line including the central point of the first display area and the point in the first sub-display area, wherein the panel driving block generates a first sub-data signal by converting an image signal, which corresponds to the first sub-display area, of the second image signal based on first sub-color coordinates in the color space, and generates a second sub-data signal by converting an image signal, which corresponds to the second sub-display area, of the second image signal based on second sub-color coordinates in the color space, and wherein the second sub-color coordinates are color coordinates obtained by shifting the first sub-color coordinates in the color space.

10. The display device of claim 9, wherein the second sub-color coordinates are color coordinates obtained by shifting the first reference color coordinates toward the second color in the color space.

11. The display device of claim 1, wherein the panel driving block includes:

a controller which generates image data including first image data and second image data based on the first image signal and the second image signal; and a source driving block which receives the image data from the controller and transmits the first data signal and the second data signal to the display panel, wherein the controller includes:

a correcting unit which generates the first image data by converting the first image signal based on the first reference color coordinates, and generates the second image data by converting the second image signal based on the second reference color coordinates.

12. The display device of claim 11, wherein the correcting unit includes:

a signal dividing unit which receives an image signal from an outside and generates the first image signal and the second image signal based on the image signal and an area signal, and wherein the area signal includes information on the first display area and the second display area.

13. The display device of claim 12, wherein the correcting unit further includes:

a first signal converting unit which receives the first image signal and the first reference color coordinates, and generates the first image data by converting the first image signal based on the first reference color coordinates; and a second signal converting unit which receives the second image signal and the second reference color coordinates, and generates the second image data by converting the second image signal based on the second reference color coordinates.

14. The display device of claim 13, wherein the correcting unit further includes:

a synthesis unit which receives the first image data and the second image data and generates the image data based on the first image data and the second image data.

15. The display device of claim 14, wherein the correcting unit further includes:

a color coordinate shifting unit which receives the second image signal and the first reference color coordinates, and generates the second reference color coordinates based on the second image signal and the first reference color coordinates.

16. The display device of claim 1, wherein the panel driving block generates the first data signal by converting the first image signal based on the first reference color coordinates, and generates the second data signal by converting the second image signal based on the second reference color coordinates and a brightness correcting signal, wherein the first data signal has a first brightness and the second data signal has a second brightness, and wherein the second brightness is less than the first brightness.

17. The display device of claim 16, wherein the panel driving block includes:

a controller which generates image data including first image data and second image data based on the first image signal and the second image signal; and a source driving block which receives the image data from the controller and transmits the first data signal and the second data signal to the display panel, and wherein the controller includes:

a correcting unit which generates the first image data by converting the first image signal based on the first reference color coordinates, and generates the second image data by converting the second image signal based on the second reference color coordinates and the brightness correcting signal.

18. The display device of claim 17, wherein the correcting unit includes:

a signal dividing unit which receives an image signal from an outside and generates the first image signal and the second image signal based on the image signal and an area signal, and wherein the area signal includes information on the first display area and the second display area.

19. The display device of claim 18, wherein the correcting unit further includes:

a first signal converting unit which receives the first image signal and the first reference color coordinates, and generates the first image data by converting the first image signal based on the first reference color coordinates; and a second signal converting unit which receives the second image signal, the second reference color coordinates, and the brightness correcting signal, and generates the second image data by converting the second image signal, based on the second reference color coordinates and the brightness correcting signal.

20. The display device of claim 19, wherein the correcting unit further includes:

a synthesis unit which receives the first image data and the second image data and generates the image data based on the first image data and the second image data.

* * * * *